(12) United States Patent
Schandl et al.

(10) Patent No.: US 11,884,449 B2
(45) Date of Patent: Jan. 30, 2024

(54) CAN LID, CAN AND METHOD FOR MANUFACTURING A CAN LID

(71) Applicant: RE-LID ENGINEERING AG, Ruggell (LI)

(72) Inventors: Christian Schandl, Wiener Neustadt (AT); Alois Bühler, Triesen (LI)

(73) Assignee: RE-LID ENGINEERING AG, Ruggell (LI)

( * ) Notice: Subject to any disclaimer, the term of this patent is extended or adjusted under 35 U.S.C. 154(b) by 0 days.

(21) Appl. No.: 17/309,666

(22) PCT Filed: Dec. 16, 2019

(86) PCT No.: PCT/EP2019/085335
§ 371 (c)(1),
(2) Date: Jun. 14, 2021

(87) PCT Pub. No.: WO2020/127037
PCT Pub. Date: Jun. 25, 2020

(65) Prior Publication Data
US 2022/0024638 A1     Jan. 27, 2022

(30) Foreign Application Priority Data

Dec. 17, 2018  (EP) ..................................... 18212937

(51) Int. Cl.
*B65D 17/50*     (2006.01)
*B65D 47/28*     (2006.01)

(52) U.S. Cl.
CPC ......... *B65D 17/506* (2013.01); *B65D 47/286* (2013.01); *B65D 2401/15* (2020.05);
(Continued)

(58) Field of Classification Search
CPC ............................ B65D 17/506; B65D 47/286
(Continued)

(56) References Cited

U.S. PATENT DOCUMENTS 2,302,972 A    11/1942 Nuckols
2,429,984 A    11/1947 Berglund
(Continued)

FOREIGN PATENT DOCUMENTS

CN        1863709 A    11/2006
CN      103167988 A     6/2013
(Continued)

OTHER PUBLICATIONS

International Search Report and Written Opinion in corresponding International Application No. PCT/EP2019/085335 dated Jan. 29, 2020.
(Continued)

*Primary Examiner* — Paul R Durand
*Assistant Examiner* — Michael J. Melaragno
(74) *Attorney, Agent, or Firm* — Westman, Champlin & Kochler, P.A.

(57) ABSTRACT

A can lid for a can includes a lid panel with a pouring opening, an actuating element on an upper side of the lid panel, and a closure element disposed on a lower side of the lid panel which faces an interior of the can with the can lid attached thereto. The closure element is shiftable between a closed position, in which the closure element closes the pouring opening in a liquid-tight and/or gas-tight manner, and an open position, in which the pouring opening is at least partially uncovered, along the lid panel substantially translationally in a guided manner by the actuating element. The closure element and the actuating element are made of a metallic material and are fastened to one another by a riveted connection and/or a welded connection that moves along a guide slot in the lid panel during shifting of the closure element.

22 Claims, 11 Drawing Sheets

(52) U.S. Cl.
CPC .............. *B65D 2517/0046* (2013.01); *B65D 2517/0091* (2013.01)

(58) Field of Classification Search
USPC ........................................................ 220/270
See application file for complete search history.

(56) References Cited

U.S. PATENT DOCUMENTS

| | | | |
|---|---|---|---|
| 3,259,265 A * | 7/1966 | Stuart | B65D 17/4012 |
| | | | D9/438 |
| 3,363,798 A | 1/1968 | Garangiotis | |
| 3,447,724 A | 6/1969 | Fiddyment | |
| 3,705,670 A * | 12/1972 | Douty | B65D 47/286 |
| | | | 222/541.9 |
| 3,705,671 A * | 12/1972 | Douty | B65D 47/286 |
| | | | 222/541.9 |
| 3,708,091 A | 1/1973 | Douty | |
| 3,717,276 A | 2/1973 | Luczak et al. | |
| 3,952,914 A * | 4/1976 | Vogt | B65D 17/506 |
| | | | 220/269 |
| 4,023,703 A | 5/1977 | Strobe et al. | |
| 4,077,538 A * | 3/1978 | Waterbury | B65D 17/506 |
| | | | 220/268 |
| 4,078,702 A | 3/1978 | Neff | |
| 4,099,642 A | 7/1978 | Nergard | |
| 4,127,212 A | 11/1978 | Waterbury | |
| 4,136,797 A | 1/1979 | Potts | |
| 4,162,742 A * | 7/1979 | Vogt | B65D 17/506 |
| | | | 222/541.6 |
| 4,170,724 A | 10/1979 | Waterbury | |
| 4,171,060 A | 10/1979 | Howard et al. | |
| 4,183,443 A | 1/1980 | DeParales et al. | |
| 4,190,174 A * | 2/1980 | Haimowitz | B65D 47/2018 |
| | | | 220/802 |
| 4,215,794 A * | 8/1980 | Lewis | B65D 17/4012 |
| | | | 220/270 |
| 4,234,099 A | 11/1980 | Tarro | |
| 4,339,053 A | 7/1982 | Tarro | |
| 4,361,249 A * | 11/1982 | Tuneski | B65D 47/2018 |
| | | | 220/714 |
| 4,407,424 A * | 10/1983 | Heyn | B65D 17/506 |
| | | | 220/269 |
| 4,433,792 A * | 2/1984 | Mandel | B65D 17/4014 |
| | | | 220/269 |
| 4,442,950 A * | 4/1984 | Wilson | B65D 17/4014 |
| | | | 220/269 |
| 4,463,866 A * | 8/1984 | Mandel | B65D 17/4014 |
| | | | 220/269 |
| 4,489,018 A | 12/1984 | Ball | |
| 4,506,809 A | 3/1985 | Corsette | |
| 4,524,879 A | 6/1985 | Fundom et al. | |
| 4,541,541 A | 9/1985 | Hickman et al. | |
| 4,572,398 A | 2/1986 | Juty | |
| 4,576,306 A | 3/1986 | Kelsey et al. | |
| 4,580,692 A | 4/1986 | La Barge et al. | |
| 4,605,141 A | 8/1986 | Won | |
| 4,673,099 A | 6/1987 | Wells | |
| 4,681,238 A * | 7/1987 | Sanchez | B65D 17/4014 |
| | | | 220/270 |
| 4,711,372 A | 12/1987 | Gach | |
| 4,746,032 A | 5/1988 | Huang | |
| 4,747,511 A | 5/1988 | Dutt et al. | |
| 4,749,099 A | 6/1988 | Davis et al. | |
| 4,784,283 A * | 11/1988 | Cantu | B65D 17/401 |
| | | | 220/269 |
| 4,842,159 A | 6/1989 | Heidrich | |
| 4,865,215 A * | 9/1989 | Wells | B65D 17/4014 |
| | | | 220/269 |
| 4,877,129 A * | 10/1989 | Wells | B65D 17/4014 |
| | | | 220/269 |
| 4,880,137 A | 11/1989 | Wells | |
| 5,080,249 A | 1/1992 | Shock | |
| 5,086,941 A | 2/1992 | English et al. | |
| 5,129,773 A * | 7/1992 | Shock | B65D 17/4014 |
| | | | 413/25 |
| 5,242,075 A * | 9/1993 | Ott | B65D 47/265 |
| | | | 220/849 |
| 5,285,924 A | 2/1994 | Morris | |
| 5,555,993 A | 9/1996 | Borkowski et al. | |
| 5,810,189 A * | 9/1998 | Baker | B65D 17/4014 |
| | | | 220/269 |
| 5,813,559 A | 9/1998 | Cho | |
| 5,938,062 A * | 8/1999 | Paramski | B65D 83/0044 |
| | | | 220/254.9 |
| 6,050,456 A * | 4/2000 | Soper | B65G 65/46 |
| | | | 222/413 |
| 6,059,137 A * | 5/2000 | Westwood | B65D 17/4014 |
| | | | 220/269 |
| 6,279,769 B1 * | 8/2001 | Duvander | B65D 5/748 |
| | | | 220/269 |
| 6,626,314 B1 | 9/2003 | McHenry et al. | |
| 6,732,875 B2 | 5/2004 | Smith et al. | |
| 6,763,963 B1 * | 7/2004 | Martin | B65D 17/4014 |
| | | | 220/254.1 |
| D531,033 S | 10/2006 | Schmidtner et al. | |
| 7,152,753 B2 * | 12/2006 | Huffman | B65D 17/4014 |
| | | | 220/272 |
| 7,156,251 B2 | 1/2007 | Smith et al. | |
| 7,159,732 B2 | 1/2007 | Smith et al. | |
| D549,098 S | 8/2007 | Lohrman et al. | |
| 7,275,653 B2 | 10/2007 | Tedford, Jr. | |
| 7,500,577 B2 * | 3/2009 | Wichelhaus | B65D 17/4014 |
| | | | 220/269 |
| 7,513,380 B2 | 4/2009 | Canedo | |
| D594,329 S | 6/2009 | McEldowney et al. | |
| D615,861 S | 5/2010 | Watts et al. | |
| 7,845,510 B2 | 12/2010 | Schmidtner et al. | |
| 7,850,037 B2 | 12/2010 | Schmidtner et al. | |
| 7,874,447 B2 | 1/2011 | Schmidtner et al. | |
| D632,562 S | 2/2011 | Toms | |
| 7,891,517 B2 | 2/2011 | Simmons | |
| 7,918,359 B2 | 4/2011 | Paris et al. | |
| 8,240,498 B2 * | 8/2012 | Ramsey | B65D 17/4014 |
| | | | 220/254.1 |
| 8,336,725 B2 | 12/2012 | Ramsey et al. | |
| 8,336,726 B2 | 12/2012 | Ramsey et al. | |
| 8,434,635 B2 * | 5/2013 | Wichelhaus | B65D 17/4014 |
| | | | 29/525.01 |
| 8,469,218 B2 | 6/2013 | Bratsch | |
| 8,608,007 B2 * | 12/2013 | Seo | B65D 17/4014 |
| | | | 220/269 |
| 8,720,740 B2 | 5/2014 | Bratsch | |
| D708,944 S | 7/2014 | van Goolen | |
| 8,794,469 B2 | 8/2014 | Bratsch | |
| 8,833,585 B2 | 9/2014 | Ramsey et al. | |
| 8,844,744 B2 | 9/2014 | Lucas | |
| 8,844,761 B2 * | 9/2014 | Zabaleta | B65D 17/401 |
| | | | 220/267 |
| 8,857,644 B2 | 10/2014 | Phillips | |
| 8,931,656 B2 | 1/2015 | Ramsey et al. | |
| D722,266 S | 2/2015 | Abe | |
| 9,073,655 B2 | 7/2015 | Bratsch | |
| 9,162,796 B2 | 10/2015 | Bratsch | |
| D747,649 S | 1/2016 | Phillips | |
| 9,272,823 B2 | 3/2016 | Bratsch | |
| D762,116 S | 7/2016 | Prendergast-Kelly et al. | |
| 9,440,767 B2 * | 9/2016 | Vanderstraeten | B21D 51/2653 |
| 9,463,910 B2 | 10/2016 | Schandl | |
| 9,517,866 B2 | 12/2016 | Coffey et al. | |
| 9,878,833 B2 | 1/2018 | Phillips | |
| 9,938,052 B2 | 4/2018 | Dabbur | |
| D816,500 S | 5/2018 | Torrison et al. | |
| 9,963,281 B2 | 5/2018 | Bratsch | |
| D820,678 S | 6/2018 | Chapman et al. | |
| 10,124,942 B2 | 11/2018 | Seiders et al. | |
| 10,213,033 B2 | 2/2019 | Bratsch et al. | |
| 10,232,992 B2 | 3/2019 | Seiders et al. | |
| 10,273,063 B2 * | 4/2019 | Schandl | B65D 47/32 |
| 10,392,158 B2 | 8/2019 | Bratsch et al. | |
| D859,155 S | 9/2019 | Reiley et al. | |
| 10,407,224 B2 | 9/2019 | Kleiner | |

(56) References Cited

U.S. PATENT DOCUMENTS

| | | | |
|---|---|---|---|
| 10,781,012 | B2 | 9/2020 | Bratsch |
| 11,014,707 | B2 * | 5/2021 | Sanbar .................. A45F 3/18 |
| 2004/0065664 | A1 | 4/2004 | Steadman |
| 2006/0201944 | A1 * | 9/2006 | Shibasaka ............ B29C 43/18 220/254.1 |
| 2006/0249511 | A1 * | 11/2006 | Yaffe ................ B65D 17/4014 220/254.1 |
| 2006/0289540 | A1 * | 12/2006 | Lee ................... B65D 17/4014 220/714 |
| 2007/0012698 | A1 | 1/2007 | Durdon et al. |
| 2007/0068943 | A1 * | 3/2007 | Ramsey ............... B65D 17/506 220/269 |
| 2008/0314904 | A1 | 12/2008 | Perra |
| 2009/0206083 | A1 * | 8/2009 | Heigl ................ B65D 17/4014 220/272 |
| 2010/0038372 | A1 | 2/2010 | Bratsch |
| 2010/0126992 | A1 | 5/2010 | Phillips |
| 2010/0206875 | A1 | 8/2010 | Bratsch |
| 2011/0163096 | A1 * | 7/2011 | Wichelhaus ....... B65D 17/4014 220/270 |
| 2012/0152949 | A1 | 6/2012 | Bratsch |
| 2012/0248113 | A1 * | 10/2012 | Majcen ............. B65D 17/4014 220/269 |
| 2013/0161325 | A1 * | 6/2013 | Vanderstraeten .. B21D 51/2653 413/2 |
| 2013/0228586 | A1 * | 9/2013 | Schandl ................ B65D 43/22 220/849 |
| 2014/0332548 | A1 | 11/2014 | Bratsch et al. |
| 2015/0375910 | A1 | 12/2015 | Cohen Bissu |
| 2016/0000246 | A1 * | 1/2016 | Vanderstraeten .. B65D 81/2053 220/714 |
| 2016/0376077 | A1 * | 12/2016 | Schandl ............. B65D 51/1688 220/203.05 |
| 2019/0240718 | A1 | 8/2019 | Bratsch |
| 2020/0055646 | A1 | 2/2020 | Harris et al. |
| 2022/0024638 | A1 * | 1/2022 | Schandl ............... B65D 47/286 |
| 2022/0033139 | A1 * | 2/2022 | Bühler ................ B65D 17/506 |

FOREIGN PATENT DOCUMENTS

| | | | | |
|---|---|---|---|---|
| CN | 105916779 | A | 8/2016 | |
| DE | 102008011919 | A1 | 9/2009 | |
| DE | 102010056552 | A1 | 7/2012 | |
| DE | 102012213093 | A | 3/2014 | |
| EP | 2426058 | A1 * | 3/2012 | ........... B65D 17/166 |
| EP | 2614010 | B1 | 7/2013 | |
| EP | 2848547 | A1 | 3/2015 | |
| WO | 2009049601 | A1 | 4/2009 | |
| WO | 2009062004 | A1 | 5/2009 | |
| WO | WO-2010000340 | A1 * | 1/2010 | ........... B65D 17/166 |
| WO | WO-2012028338 | A1 * | 3/2012 | ........... B65D 17/166 |
| WO | WO-2012028694 | A1 * | 3/2012 | ......... B21D 51/2653 |
| WO | 2015185718 | A1 | 12/2015 | |
| WO | 2015185829 | A1 | 12/2015 | |
| WO | 2016172131 | A1 | 10/2016 | |
| WO | 2018068966 | A1 | 4/2018 | |
| WO | 2020126969 | A1 | 6/2020 | |
| WO | 2020127071 | A1 | 6/2020 | |

OTHER PUBLICATIONS

Office Action in family-related Chinese application No. 201980083494.5 dated Oct. 25, 2022.
Office Action in family-related Chinese application No. 201980091865.4 dated Nov. 9, 2022.
Office Action in family-related European application No. 18212937.9 dated Jul. 8, 2019.
Office Action in family-related European application No. 18212937.9 dated May 26, 2020.
Office Action in family-related Indian application No. 202117027000 dated Dec. 13, 2022.
Office Action in family-related Indian application No. 202117027002 dated Dec. 16, 2022.
Office Action in family-related Russian application No. 2021121014 dated Dec. 7, 2021.
Office Action in Japanese Patent Application No. 2021-534718 dated Sep. 5, 2023.

* cited by examiner

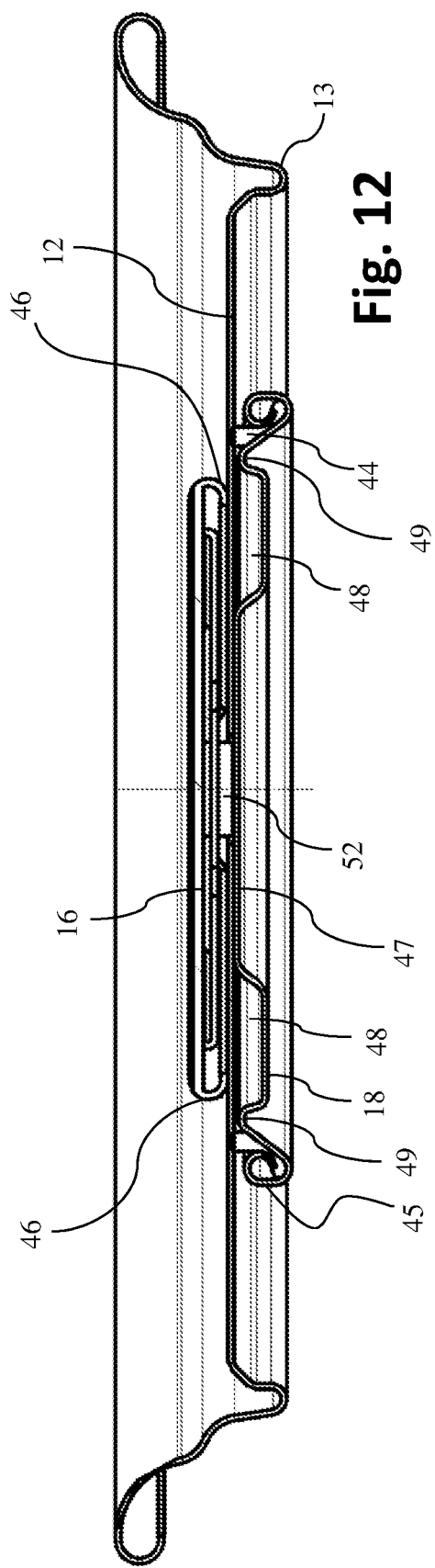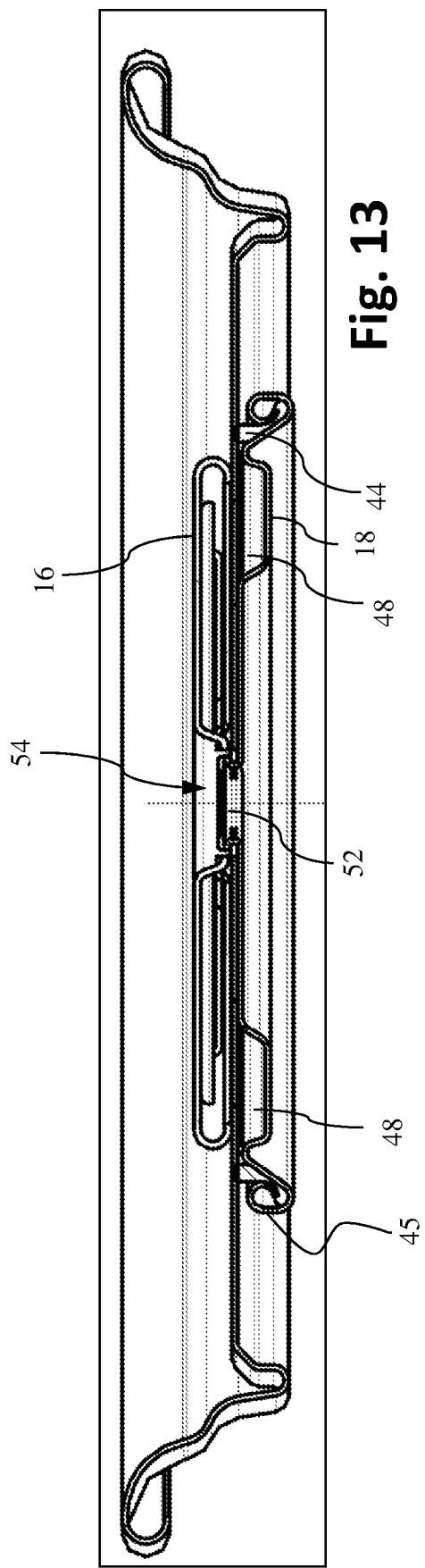

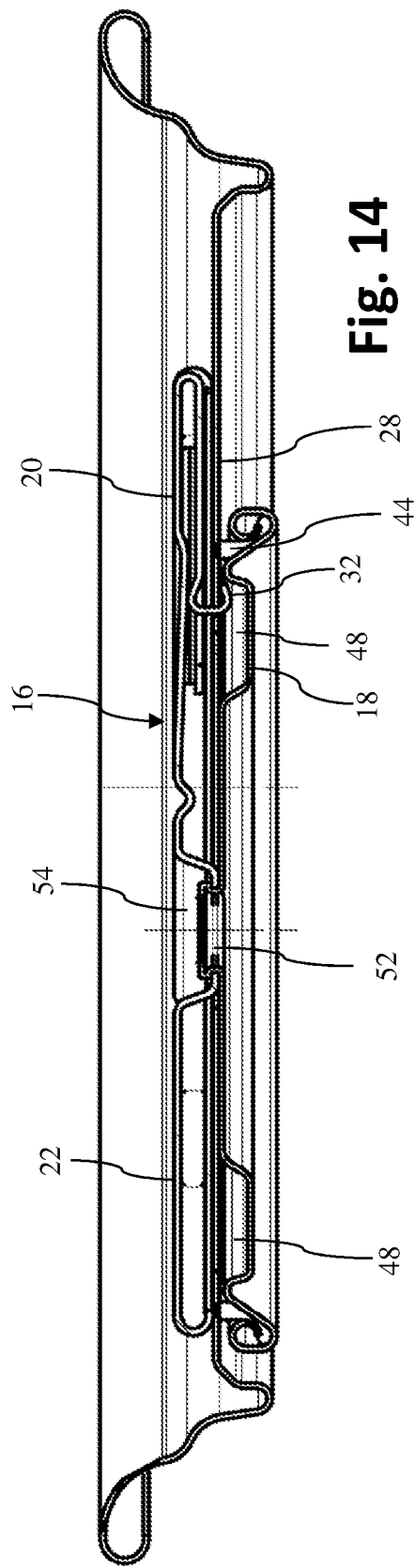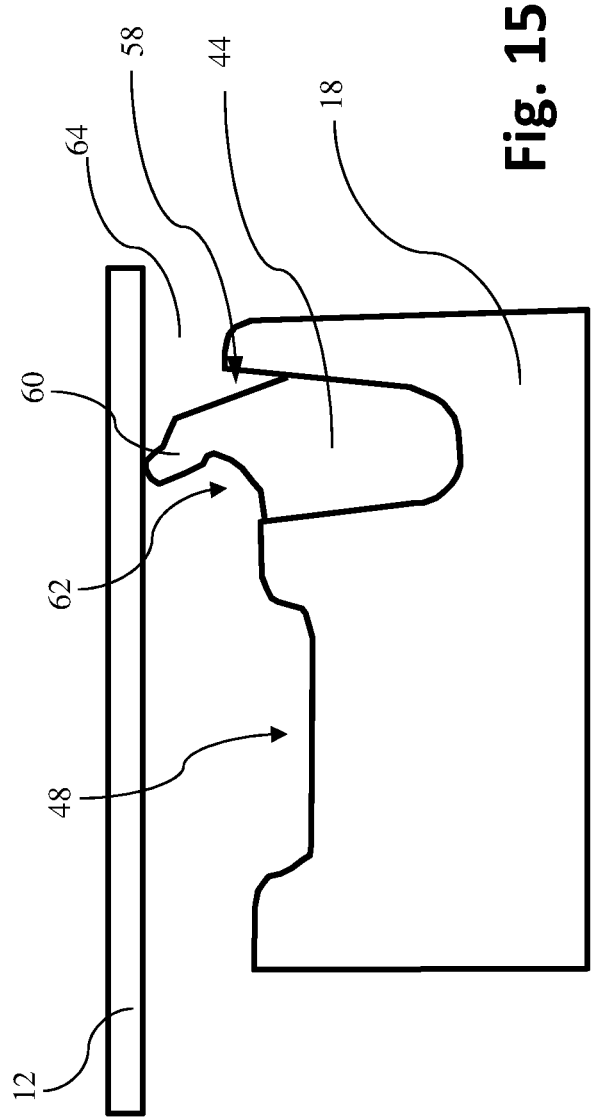

Fig. 16
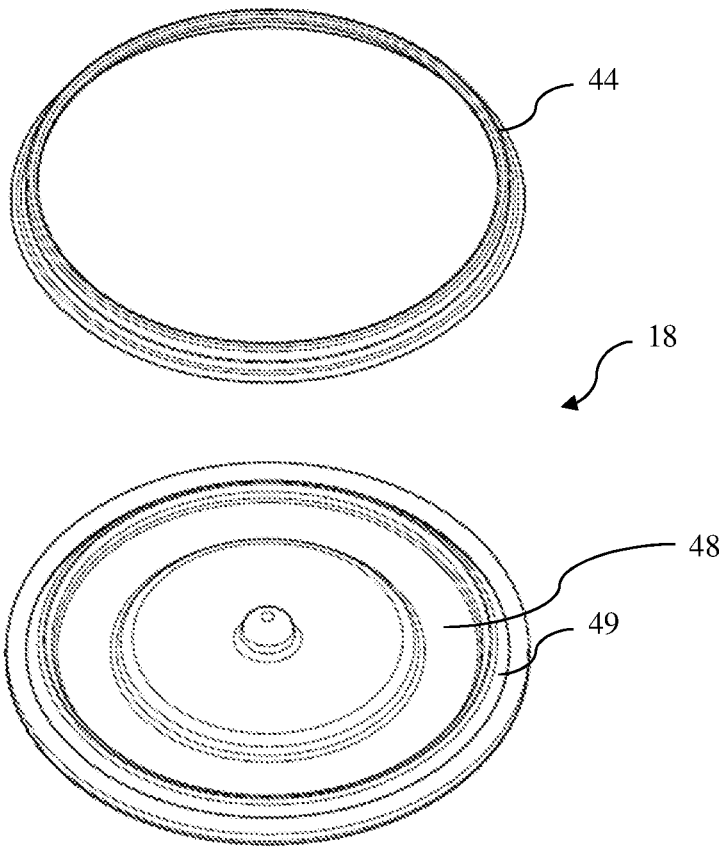
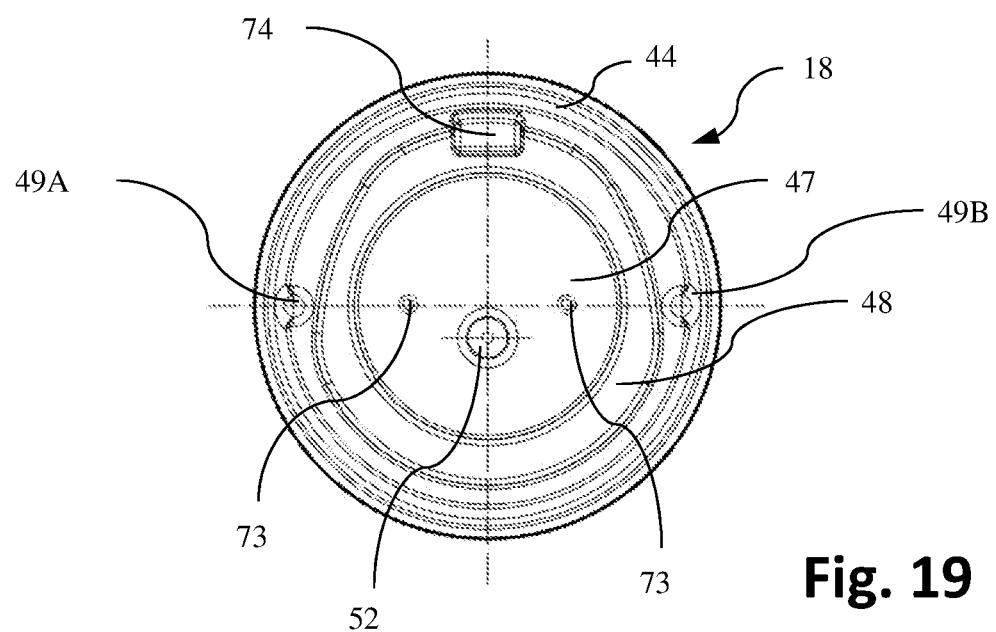
Fig. 19

CAN LID, CAN AND METHOD FOR MANUFACTURING A CAN LID

CROSS-REFERENCE TO RELATED APPLICATION(S)

This Application is a Section 371 National Stage Application of International No. PCT/EP2019/085335, filed Dec. 16, 2019 and published as WO 2020/127037 A1 on Jun. 25, 2020, and further claims priority to European Application Ser. No. 18212937.9, filed Dec. 17, 2018.

TECHNICAL FIELD

The present invention relates to a can lid. In addition, the invention relates to a can and a method for manufacturing a can lid.

BACKGROUND

Beverage cans having a cylindrical container made of aluminum or tinplate are known. A lid is folded thereon, to which a metal tab is riveted as an opener. When the metal tab is lifted, an oval score line is broken and part of the lid is pressed into the can interior to uncover a drink opening. A disadvantageous aspect is that it is not possible to reseal the beverage can. As a result, a beverage inside the can quickly become stale. In addition, during further transport, the beverage may easily be spilled.

Resealable can lids are also known. For example, EP 2 614 010 B1 describes a lid of a container where a closure element disposed on the lower side can be pivoted between a closed position and an open position by an actuating element disposed on the upper side. However, the closure element and the actuating element are large components, which is disadvantageous during filling. In addition, in this way the can lid is heavy and expensive. Furthermore, the actuating element and the closure element are usually made of plastic, making recycling difficult. Moreover, the rotational movement requires high actuating forces putting unfavorable stress on the components, for example by a strong shear force.

SUMMARY

Embodiments of the present invention improve a can lid which is resealable. Furthermore, embodiments of the invention to improve a method for manufacturing a resealable can lid and a resealable can.

A first aspect relates to a can lid for a can. The can may preferably be configured as a beverage can and/or as a storage container for bulk material. The can lid may comprise at least one lid panel configured to delimit an upper side of the can, preferably by crimping an outer circumferential edge of the lid panel to a lateral wall of the can. With respect to material and design, the lid panel may correspond, e.g., to a lid of conventional beverage cans. For example, the lid panel may be made of aluminum or tinplate, optionally with a plastic coating, for example as corrosion protection. The lid panel may have at least one pouring opening through which a substance present in the can may be poured out. Preferably, the pouring opening is always provided in the lid panel. The pouring opening is therefore not broken open by a metal tab when the can is initially opened, as is usually the case with beverage cans.

The can lid may have an actuating element which is disposed on an upper side of the lid panel which faces away from the can interior when the can lid is attached thereto. In addition, the can lid may have a closure element which is disposed on a lower side of the lid panel which faces the can interior when the can lid is attached thereto. The closure element may be shiftable between a closed position, in which the closure element closes the pouring opening in a fluid-tight and/or gas-tight manner, and an open position, in which the pouring opening is at least partially uncovered, along the lid panel substantially translationally in a guided manner by means of the actuating element. The translational movement is very intuitive, puts little stress on a connection between the closure element and the actuating element, and requires low actuating forces.

Preferably, the closure element and/or the actuating element are made of a metallic material, preferably an aluminum material or tinplate. This facilitates recycling. Preferably, the closure element and/or the actuating element is made of the same materials as the lid panel and/or a body of the can, so that preferably the whole can is recyclable without disassembly. For example, the closure element and/or the actuating element may be made of a tinplate or aluminum sheet and optionally have a plastic layer for corrosion protection. Preferably, the plastic layer is provided both on the inside and the outside of the lid panel, the closure element, the actuating element and/or the can body.

On its upper and/or lower side, the closure element is preferably not planar. In particular, the closure element may have one or more recesses or one or more protruding sections on its upper side. Such a recess may be formed, for example, in the area of a rivet nipple or as a recessed section of the lower side corresponding to this rivet nipple. A protruding section, corresponding to an air channel extending along the upper side of the closure element, may be formed, for example, on the lower side thereof.

The closure element and the actuating element are fastened to one another by means of a connection. The connection is preferably fixed and/or non-variable in length. In other words, the distance between the actuating element and the closure element in the area of the connection is preferably fixed and/or non-variable. This allows, among other things, an automatic adjustment of the contact pressure of the closure element against the lid, which will be discussed in more detail below.

Preferably, the closure element and the actuating element are fastened to each other by means of a connection that does not penetrate the closure element. In this way, the contents of the can is reliably protected. In particular, unwanted leakage with a closed lid can be excluded. Such a connection is advantageous when metallic materials are used for the closure element and/or the actuating element, since a through opening for the connection can only be sealed with great effort and tends to leak under pressure. A riveted connection is particularly suitable. A riveted connection can withstand large forces particularly well, for example in the event of abusive actuation. In addition, riveting techniques allow high production rates with low rejection. A welded connection is also particularly suitable, since only a small amount of material is required. For example, the actuating element and the closure element may be fastened together using ultrasound or friction welding, in particular when plastics are used for manufacturing the closure element and/or the actuating element.

As the closure element is being shifted from the closed position to the open position, the connection may be moved along a guide slot in the lid panel. The connection, in particular a rivet, rivet section and/or welding section, may thus be disposed in a plane defined by the lid panel. In particular, the connection may penetrate the lid panel, i.e. be disposed in a through opening of the lid panel. In this way, the connection may serve as a guide. In addition, an overall height of the can lid may thus be particularly flat, which is advantageous for filling. For example, the overall height determines how many can lids may be provided in a magazine. Thin resealable can lids allow magazine fillings similar to those of non-resealable can lids. Therefore, compared to non-resealable cans, the production rate on the same filling line is the same or only slightly lower.

The lid panel preferably has an outer diameter of at least 4.5 cm, at least 5 cm or at least 5.5 cm. The external dimensions of the lid panel, apart from through openings, may correspond to a standardized lid panel of beverage cans, in particular a B64 or CDL lid panel. The B64 lid panel may be, e.g., of the type 200, 202, 204, 206 or 209. The CDL lid panel may be, for example, of the type 200 or 202. The lid panel may be substantially flat and/or round in shape, preferably circular. The lid panel may have a circumferential bead that increases its stability and aids in forming the folded edge. The lid panel may also be referred to as a shell.

All metallic parts of the can lid on the flat side which faces a storage space of the can, preferably also on the flat side which faces away therefrom, are preferably coated with plastic or covered with a plastic film. This serves to protect against corrosion and to protect the substance stored in the can. Thus, for example, it is possible to prevent that metal is dissolved by a liquid contained in the can. For example, it is thus also possible to prevent metal particles from getting into a beverage. Apart from this coating or film, the lid panel, the actuating element and/or the closure element may be made of the metallic material, in particular of only one and/or of the same metallic material. The closure element may be substantially flat and/or round in shape The can for which the can lid is provided is preferably for storing a beverage, soup or bulk product. The beverage may include, for example, fibers, such as pulp in the case of an orange juice. The bulk material may be, for example, a spice. Soup may contain, for example, piece goods such as noodles, meat pieces, etc. Preferably, the pouring opening is large enough to allow them to be poured out as well. For this purpose, the closure element in the open position may expose a pouring opening that is larger than solid bodies in the can. The pouring opening may be a through opening from an interior to an exterior of the can. A cross-section of the pouring opening is preferably at least 1.5 cm$^2$, more preferably at least 1.8 cm$^2$, and most preferably at least 2 cm$^2$.

The pouring opening preferably has an oval, circular or crescent shape. In the longitudinal direction of the guide slot, a front edge section and a rear edge section of the pouring opening are preferably arc-shaped and/or curved. Preferably, both a front edge section and a rear edge section are curved in the same direction. As a result, at the edge section of the pouring opening at which the guide slot is disposed, the lid panel preferably forms two tongues protruding into the pouring opening. The connection may be guided through these tongues in a foremost position of the closure element.

The guide slot may be a through opening in the lid panel. Preferably, the guide slot is formed as an elongated opening. A width of the guide slot may be substantially constant over its length. The guide slot may determine the translational movement of the closure element and the actuating element between the closed position and the open position. At least a portion of the closure element and/or the actuating element may be guided through the guide slot, for example by said portion abutting an edge of the lid panel which delimits the guide slot. Respective lateral walls of the guide slot, which preferably form a radial inner edge of the lid panel and/or are an edge of the lid panel, may thus form a guide.

The pouring opening and/or the guide slot are preferably punched out. They may be punched-out passage sections in the lid panel. The closure element may seal the interior opposite the pouring opening in the closed position, for example by means of a seal and/or by pressing on the lid panel. This pressing may be performed by a preload and/or the connection with the actuating element. The actuating element may move together with the closure element, i.e. likewise preferably guided along the lid panel in a substantially translational manner. By means of their connection, for example by the riveted connection, the actuating element and the closure element are permanently connected to each other in normal use. When used as intended, such as an opening and closing of the can, it is preferably not intended to separate the actuating element and the closure element from each other. The connection may be configured to secure the actuating element and the closure element to the lid panel. Preferably, the connection, in particular the riveted connection, is preloaded. The actuating element may be cambered by the preload. The camber is preferably formed in a direction which is reduced by an increased internal pressure and/or by pressing on the actuating element. This facilitates opening.

In the closed position, the closure element preferably covers the pouring opening and the guide slot in a gas-tight and/or fluid-tight manner. The closure element preferably extends further over the lid panel than the pouring opening and guide slot together. The closure element is preferably rotationally symmetrical, which allows easier processing during manufacturing of the closure. In the closed position, respective outer edges of the closure element are preferably disposed radially outside of respective through openings in the lid panel. A diameter and/or a length of the closure element, in particular a diameter and/or a width of an area surrounded by a seal of the closure element, is preferably larger than a length between a front point of the pouring opening, in particular an apex point of the pouring opening, and an opposite rear end of the guide slot.

The actuating element preferably extends further over the lid panel than the pouring opening and guide slot together, in particular in the closed position. In the closed position, the actuating element preferably covers the pouring opening and the guide slot. This may prevent an accumulation of dirt on the closure element, in the guide slot and/or in the pouring opening. When the can lid is viewed along an axis perpendicular to the lid panel, i.e., in the vertical direction when the beverage can is standing upright, the closure element is preferably configured to completely overlap the pouring opening and/or the guide slot in the closed position. In the open position, the closure element uncovers at least 50%, preferably at least 70% and more preferably at least 90%, of the area of the outlet opening. Thus, the can contents are therefore directly accessible through the uncovered area, for example via a straw. That is, without bending or kinking, a straight straw may be passed through the outlet opening in the entire non-overlapped area along the viewing axis (in the vertical direction of the can). This corresponds to the manner known to consumers from common beverage cans. In addition, this may facilitate the pouring of liquids containing fibers or piece goods.

The upper side of the can lid and/or respective parts may also be referred to as the outside. Likewise, the lower side may also be referred to as the inside. Preferably, only a single connection, for example the riveted connection or a single welding point, is provided between the actuating element and the closure element. This makes the production of the can lid particularly fast and inexpensive.

Preferably, the connection is provided by a nipple formed in the closure element or the actuating element, which is connected to the corresponding other element. For example, the nipple may be riveted or welded. A nipple formed as a rivet nipple may be disposed in a corresponding rivet opening of the other of the two elements. Preferably, the nipple is embossed. For example, the metallic sheet from which the element having the nipple is formed may be embossed to form the nipple. Preferably, the nipple is integrally formed in the element. The nipple may be formed as a protruding section. The rivet nipple may eliminate the need for a separate component, such as a rivet, and also the need to pierce the closure element to form the connection. The nipple also allows a defined weld area to be specified in the case of welding. A similar riveted connection holds the metal tab which is riveted to the lid panel as a built-in can opener on conventional beverage cans. For riveting, therefore, it is preferably also possible to use plants for the production of conventional cans, making a changeover to the production of the resealable can lid particularly cost-effective. Preferably, the rivet nipple is formed in the closure element and protrudes towards the upper side. The rivet opening may be a through opening and is preferably formed in the actuating element. The connection may therefore be configured such that it does not penetrate the closure element.

Preferably, the rivet opening extends through a protrusion, in particular through a protrusion of the actuating element protruding in the direction of the lower side of the lid. The protrusion allows the overall thickness of the can lid to be small. For this purpose, the protrusion may preferably extend into the guide slot. Preferably, the protrusion may be formed by embossing. Insofar, the protrusion may be formed by a depression in the actuating element with respect to a surrounding flat area. Preferably, the adjoining area is the fastening section of the actuating element, which will be described later. Preferably, the rivet opening is disposed in the fastening section, in particular in the center. The protrusion may protrude in the direction of the element with the rivet nipple. Preferably, the protrusion protrudes from the lower side of the actuating element. For example, the protrusion may protrude from an imaginary plane in which the fastening section is disposed.

Preferably, in the open position and/or in the closed position, the protrusion extends at least partially through the guide slot. Preferably, in the open position and the closed position, the protrusion extends at least partially through the guide slot. The protrusion may thus also serve as part of the guide. In addition, this preferably provides a means of securing the actuating element against rotation. In the closed position, the protrusion may also extend at least partially through the pouring opening.

Preferably, the connection, in particular in the form of a riveted connection, is formed narrower than the guide slot at least in an area extending through the guide slot. In particular, the protrusion may be formed narrower than the guide slot at least in an area extending through the guide slot. Preferably, the connection is wider than the guide slot at least in an area extending above and/or below the guide slot. This allows the connection, in particular the riveted connection, to be supported there on the lid panel. In this way, a load, for example due to internal pressure, may be supported. The width is preferably measured in the plane of the lid panel. This plane may correspond, for example, to the plane in which the guide slot is formed. The width is preferably measured transversely to a longitudinal axis extending between a front opening of the guide slot and a rear end of the guide slot, in particular orthogonally to this longitudinal axis. The width may also be orthogonal to a vertical direction. The thickness may be measured in the vertical direction. The vertical direction is preferably perpendicular to the plane in which the lid panel extends.

Preferably, at least one planar surface is formed on the connection in a region extending through the guide slot, the at least one planar surface preferably facing an edge of the lid panel, the edge delimiting the guide slot. This planar surface allows the connection to be supported on the guide slot and thus to function particularly well as an anti-twist protection. Preferably, at least two planar surfaces are formed on the connection in a region extending through the guide slot. Preferably, the two planar surfaces are formed on opposite sides and/or substantially in parallel. Preferably, the at least one planar surface is formed on the protrusion. Preferably, the at least two planar surfaces are formed on the protrusion. The respective planar surfaces may bear against the edge of the lid panel defining the guide slot and provide an anti-twist protection. The rivet opening and/or a remaining protrusion are preferably round, in particular circular, in shape. In the area of the planar surface, the round shape may be flattened. Likewise, the nipple, in particular the rivet nipple, may be round, in particular circular, in shape.

The respective planar surfaces preferably extend in the direction perpendicular to the plane of the lid panel, i.e. in the vertical or upward direction, and/or parallel to the longitudinal axis of the guide slot and/or parallel to the edge of the lid panel which delimits the guide slot. Instead of a planar surface, a curved, stepped or toothed surface may also be provided, which provides at least two defined contact points with the edge of the lid panel which delimits the guide slot. In this way, too, an anti-twist protection may be provided.

Optionally, a further protrusion may be provided on the closure and/or actuating element for guidance.

Preferably, the can lid has at least one seal which is disposed between the closure element and the lid panel at least in the closed position of the closure element. The seal is preferably made of a softer material than the closure element. In particular, silicone, rubber, elastomers, thermoplastics or elastomeric thermoplastics may be used. In this way it becomes possible to reliably achieve a safe and pressure-tight resealing. Preferably, only a single seal is provided, which seals the closure element against the lid panel at contact points. Preferably, the closure element has a support section in the area of the connection with the actuating element. Preferably, the closure element rests along its outer edge against the lid panel only via the seal. The support section is preferably provided centrally and preferably also rests against the lid panel. A recessed channel may be provided between the seal and the edge.

The seal preferably forms a closed circumference, for example in the form of an O-ring. The cross-section of the seal may differ from a round cross-section. The seal may be formed of a flexible material, such as rubber, caoutchouc or a plastic. The seal may be circumferentially disposed on an edge of the closure element.

Preferably, the seal is at least partially received in a groove formed on an upper side of the closure element. The groove allows the seal to be held securely, in particular during repeated opening and closing. The groove may be disposed radially circumferentially on the outside in the closure element. The groove may be disposed in the closure element along an outer edge of the closure element. Preferably, the groove is open in the direction of the lid panel. The groove may be formed, for example, by an embossing or deep drawing process. The groove may also be formed as a deformation in a flat plane of a sheet, for example as a bead. In this case, for example, a material thickness of the closure element in the area of the groove may be uniform. The groove may also be provided by a local thickness reduction, for example by pressing in or removing the material of the closure element.

The seal is preferably fixed to the closure element by means of an outer edge of the closure element, the outer edge being bent into the seal and/or over a section of the seal. This allows the seal to be held particularly securely on the closure element. This may be advantageous during assembly. In addition, the seal may thus also cover an open cut edge, e.g. in the case of a closure element punched out of a metal sheet. For example, this cut edge may be formed without a plastic coating and thus be protected by the seal against corrosion and/or contact with a liquid in the can. Advantageously, the groove may be clamped with the outer edge in a folding process. In this way, even a sharp edge may be covered. Preferably, the seal is disposed in a groove and clamped by the outer edge. The outer edge may be radially outward and circumferential. The outer edge may be a punched or cut edge. The outer edge may press into the seal. Due to its bending, the outer edge may be located radially further inwards than an adjoining area of the closure element.

The seal may be fixed in the groove, for example in addition to or as an alternative to clamping with the outer edge, e.g. by means of bonding. The seal may also be injected into the groove.

The seal may have an undercut. The undercut may be located at least partially within the groove or it may be located outside of the groove. Alternatively, or additionally, a cross-section of the portion of the seal received in the groove may be smaller than a cross-section of the groove. Alternatively, the seal may have a lip extending from radially outward to radially inward, optionally with a recess below the lip. The undercut and/or lip may be formed circumferentially. A cross-section of the seal may be appropriately configured to have the lip, undercut, and/or a smaller cross-section than the groove. These respective configurations allow the closure element to be displaced with lower actuating forces. In addition, the sealing effect is increased. Furthermore, the seal may seal substantially equally well at different contact pressures. For example, in a beverage can, the internal pressure may vary depending on the temperature and, in the case of a carbonated beverage, due to movements. The configuration of the seal makes it possible to provide reliable sealing over a wide range of internal pressures.

The seal may have a round, square or irregular cross-section.

Optionally, the seal may have two sealing lips, which are spaced apart from one another and rest against the closure element or the lid panel at least in the closed position. Preferably, the two sealing lips lie against a lower side of the lid panel, wherein the seal is disposed in the groove on the closure element. The double sealing lip enables a secure seal even at low internal pressure, for example with a non-carbonated beverage. Two separate seals with at least one lip each may also be provided.

Preferably, the lid panel and/or the closure element has a notch and/or an embossment in a portion which is disposed adjacent to, or which delimits, a portion of the pouring opening which is uncovered first when the closure element is repositioned from the closed position to the open position. As a result, a fizzing sound may be generated when a pressurized can is opened. This may signal the freshness of the contents to a consumer. In addition, the acoustics may thus be similar to a non-resealable can when opened, providing a greater similarity to the consumer to the effects of opening and closing a conventional can. At the start of the opening process, the notch or embossment may form a small channel and/or nozzle. For example, the embossment or notch may taper. The fizzing may, e.g., be produced by accelerating the exiting gas to supersonic.

The notch or embossment is preferably located in the area of the front end of the pouring opening, which may correspond to an apex of the pouring opening. In the closed position, the closure element may overlap the notch or embossment. In the open position, the closure element may be free of overlap with the notch or embossment.

Preferably, the lid panel further comprises a pressure equalizing opening. The pressure equalizing opening may also produce fizzing at the start of an opening process. In addition, an actuating force for repositioning the closure element from the closed position to the open position may be reduced. Preferably, the pressure equalizing opening is closed by the closure element in a fluid-tight and/or gas-tight manner in the closed position and is at least partially uncovered in the open position. The pressure equalizing opening may be disposed such that, when the closure element is repositioned from the closed position to the open position, it is uncovered before the pouring opening. The pressure equalizing opening may be configured as a separate opening which is not connected to the pouring opening and/or the guide slot. For example, it may be a through opening in the lid panel, which is disposed in front of the pouring opening in the direction of shifting to the open position. The pressure equalizing opening is preferably disposed in the area of the front end of the pouring opening, in particular at the apex of the pouring opening. In the closed position, the closure element may overlap the pressure equalizing opening. In the open position, the closure element may be free of overlap with the pressure equalizing opening.

The cross-section of the pressure equalizing opening is preferably smaller than the cross-section of the pouring opening. For example, a cross-section of the pressure equalizing opening may be at most 20 mm$^2$, preferably at most 10 mm$^2$ or particularly preferably at most 5 mm$^2$. Preferably, the pressure equalizing opening is smaller than a usual cross-section of a straw, which may also be referred to as a drinking straw.

In the open position, an air channel is preferably formed between the closure element and the lid panel, the first end of the air channel preferably opening at the upper side of the lid panel and/or at an end region which faces away from the outer lid panel edge at the pouring opening, and the second end of the air channel preferably opens at a lower side of the lid panel at an end region of the closure element, the end region which faces away from the pouring opening. The second end may connect an interior of the can to the exterior and/or the pouring opening. This facilitates a backflow of air and/or presets the strength of a backflow. This may facilitate pouring. For example, the air channel may prevent irregular and/or gurgling pouring of liquid. Thus, a more uniform pouring is made possible.

Preferably, the air channel is blocked in the closed position and/or in an intermediate position of the closure element between the open position and the closed position. For example, the air channel may be blocked by having one end or both ends closed. For example, the intermediate position may be a position in which the pouring opening is not uncovered as much as possible, for example only at most 80%, 70% or preferably 50%. In particular, the blocking may be provided by the sealing element abutting a lower side of the lid over the entire circumference of the closure element. For example, in the closed position and/or in the intermediate position, the closure element may not be lifted off the lid panel in some sections, otherwise the air channel would be unblocked (in particular the second end).

Preferably, at least a portion of the air channel is formed by a recess in the closure element and/or the lid panel. The recess may, for example, be formed by an embossment. Due to the recess in the lid panel, the closure element can have a particularly simple configuration. The recess in the closure element may make the lid panel particularly robust and inexpensive.

Preferably, in the open position, the first end of the air channel is formed by a gap between the closure element and the actuating element and/or between the seal and the actuating element. In the closed position, a portion of the lid panel is preferably disposed in the gap, thereby blocking the air flow. The gap may be closed simply by shifting the actuating element and thus the closure element into the closed position. Such a configuration is kinematically simple and reliable.

Preferably, the second end of the air channel in the open position is formed by a gap between the closure element and the lid panel and/or between the seal and the lid panel.

According to a first variant, the gap is formed by a deflection of the closure element at a protrusion of the lid panel which faces the closure element or a bead, in particular in the open position. For the deflection, the lid panel, the actuating element and/or the closure element may deform elastically. This may eliminate the need for respective joints for forming the air channel. In particular, the closure element may be deflected downward in the open position at a radially outer bead of the lid panel, whereby the sealing effect of the closure element with the lower side of the lid panel is cancelled in the deflected section. The closure element may be tilted downward. A rotational downward deflection, which may also be referred to as tilting, occurs, for example, by means of a deformation, in particular an elastic deformation. The closure element and/or the seal is, for example, deflected downward along an end region which faces away from the pouring opening. The end region of the closure element and/or the bead on the lid panel may act like a ramp for lifting the closure element off the lid panel section-by-section. At least some sections of the edge of the closure element may be chamfered for lifting off, in particular in an area which faces away from the pouring opening. Alternatively, or additionally, the lid panel may have one or more embossments protruding in the direction of the lower side, which deflect at least some sections of the closure element downwards in the open position, thereby cancelling the sealing effect of the closure element with the lower side of the lid panel in the deflected section.

According to a second variant, the second end of the air channel is formed in the open position by the lid panel having one or more embossments protruding in the direction of the upper side, the embossments forming a flow path for the air around the closure element (in particular around the seal) in the open position of the closure element, thereby cancelling the sealing effect of the closure element with the lower side of the lid panel in the area of the one or more embossments. In this variant, the closure element may also be free of joints for pivoting the closure element relative to the lid panel.

When the can lid is viewed along an axis perpendicular to the lid panel, i.e. in the vertical direction in the case of conventional beverage cans, the closure element is preferably disposed such that in the open position it overlaps with the one or more protrusions or embossments protruding in the direction of the upper side and/or in the direction of the lower side or with the bead of the lid panel, preferably in a rear edge section. In the closed position, the closure element does not overlap with the protrusions or embossments or the bead. The rear edge region may be defined as an edge region which faces away from the pouring opening and/or is furthest away from the pouring opening.

Preferably, the guide slot and the pouring opening form a common through opening in the lid panel. The pouring opening and the guide slot are preferably connected to each other. Preferably, the guide slot has a front opening where the guide slot is open to the pouring opening and extends therefrom, preferably straight, to a rear end. By forming them together, the guide slot and the pouring opening may be manufactured together inexpensively, for example by a single punching.

Preferably, the guide slot is elongated, with a longitudinal direction of the guide slot corresponding to a shifting direction of the closure element. The longitudinal direction of the guide slot may correspond to a repositioning movement of the actuating element during opening and closing. The guide slot is preferably straight and/or at least partially centered in the lid panel. The guide slot preferably has a length of at least 0.7 cm, more preferably of at least 1 cm, and particularly preferably of at least 2.5 cm. For example, the guide slot may be 2.5 cm long. In this way, a large pouring opening may be uncovered. The guide preferably has a width of at least 2 mm, more preferably of at least 3 mm and particularly preferably of at least 4 mm. For example, the guide slot may be 3 mm wide. In this way, the connection between the closure element and the actuating element may be formed with sufficient stability. The guide slot may be rectangular, for example.

The actuating element preferably acts as a disc spring, which is supported in an outer section on the lid panel, thus pressing a central region of the actuating element, which is provided around the connection, away from the lid panel. Preferably, the closure element is pressed against the lower side of the lid panel by the connection. The central region may be recessed relative to the outer section. The actuating element may be supported on the upper side of the lid panel via the outer section, thereby pressing an upper side of the closure element and/or an upper side of the seal against the lower side of the lid panel. This support may be reinforced by a camber and/or the central region may act as a camber. The camber may correspond to a concavity. The section of the connection itself is preferably not counted as part of the central region. In particular, the protrusion with the rivet opening is preferably not counted as part of the central region. The central region preferably does not lie against the lid panel. The actuating element is thus preferably curved away from the lid panel upwardly in the central region, whereby the outer section may be pressed against the lid panel due to the connection with the closure element. In this way, it is possible to preset a substantially equal actuating force even with different internal pressures.

Preferably, the guide slot has at least one or more relief notches at its end which faces away from the pouring opening. The averted end may be a rear end of the guide slot.

The relief notches may form a radius in corners of an otherwise rectangular cross-section. For example, the relief notches may be punched out such that this end does not have a right angle. This may prevent the lid panel from tearing and/or cracking at high internal pressures. Respective relief notches preferably extend substantially perpendicular to the longitudinal direction of the closure element. The respective relief notches are preferably curved, and a center of the circle of curvature is preferably closer to the center of the lid panel than the relief notch. The respective relief notches may, e.g., be arcuate in shape. A length of the relief notch, in particular an arc length, may be greater than the width of the guide slot.

Preferably, the actuating element has at least one fastening section, in which the connection, in particular the riveted connection or the welded connection, with the closure element is formed, and a handle section connected thereto configured for gripping for the purpose of repositioning between the open position and the closed position. The sections of the actuating element may be integrally formed and/or substantially flat. In particular, the actuating element may be formed by a single sheet metal element which has been deformed, in particular bent, to form the sections. The fastening section is preferably flat and/or has a thickness of less than 3 mm, preferably less than 2 mm, in the direction perpendicular to the lid panel. The upper side of the fastening section is preferably formed substantially flat, optionally apart from the recess for the riveted connection. The fastening section and/or the handle section preferably extend substantially parallel to the upper side, in particular to a central region, of the lid panel, at least prior to a first opening. The fastening section preferably extends substantially parallel to the upper side of the lid panel even after the initial opening, in particular also during shifting along the guide slot. The handle section is preferably formed at an end region of the actuating element which faces away from the pouring opening, which makes its operation particularly ergonomic. In addition, the handle section is thus particularly well protected from contamination by can contents.

Preferably, the handle section may be pivotable, preferably manually pivotable (i.e., directly by hand), between a stowed position, in which the handle section is disposed substantially parallel to the lid panel and/or to the fastening section, and an actuating position, in which the handle section is grippable for the purpose of repositioning between the open position and the closed position. The stacking height of the can lid during filling is thus particularly low, but the handle section is nevertheless easy to grip during operation. The handle section is preferably flat and, in the stowed position, has a thickness of less than 3 mm in the direction perpendicular to the lid panel, preferably of less than 2 mm. An upper side of the handle section is preferably substantially flat. In the stowed position, the upper side of the fastening section and the upper side of the handle section form substantially one plane. When the handle section is in the stowed position, the actuating element may be substantially planar. When repositioned from the stowed position to the actuating position, the handle section is preferably pivoted upward. In particular, a rear end region of the handle section that is spaced farthest from the pouring opening is pivoted upward. Preferably, in the stowed position, at least sections of the lower side of the handle section are spaced from the upper side of the lid panel. Thus, the handle section may be easily lifted manually, in particular with a finger, for example with the fingernail. Preferably, in the actuating position, the lower side of the handle section is spaced from the upper side of the lid panel at least in sections, and preferably completely. Thus, it is possible to at least partially clasp the handle section, for example with two fingers, so that force may be exerted in a direction parallel to the upper side of the lid panel, in particular manually. A pivoting of the handle section may be a folding up, preferably folding up by an angle of at least 30°, preferably at least 45°, particularly preferably at least 60°. Preferably, the handle section is pivoted upwards from the closed position to the open position against the direction of movement of the actuating element and/or the closure element. The central region may be formed by the handle section and/or by the fastening section.

Preferably, the fastening section and the handle section are connected by means of a hinge, in particular by means of a film hinge, the hinge axis thereof preferably extending transversely, preferably orthogonally, to a longitudinal axis of the guide slot. The film hinge preferably extends transversely to the longitudinal axis of the guide slot over the entire width of the actuating element, in particular over the entire width of the fastening section and/or the handle section, preferably along an imaginary straight line. Optionally, the film hinge may be continuous or formed from several separate sections.

The film hinge is preferably configured such that die does not break when the handle section is pivoted, particularly not during a first pivot and preferably not during a repeated pivot (such as at least 5 times, at least 10 times, at least 20 times or more).

The handle section may be configured to be pivoted about the hinge axis relative to the fastening section for repositioning between the stowed position and the actuating position. The hinge facilitates actuating the actuating element, particularly pivoting of the handle section. The film hinge may be formed by a section in the actuating element having a thinner overall thickness, in particular in the form of a notch which may be produced, for example, by embossing or scoring. The thinner section, in particular in the form of the notch, preferably extends into the actuating element from the upper side thereof, in particular downwardly. The film hinge may further have the advantage that it deforms and that the handle section remains in the actuating position even against the force of gravity.

Preferably, the handle section has a starting position, which preferably corresponds to the stowed position. The actuating element may be configured such that the handle section can no longer be permanently repositioned back into the starting position after it has been initially repositioned from the starting position. Alternatively, or additionally, the actuating element may be configured such that it is plastically deformed, in particular permanently and/or permanently visually recognizable, when the handle section is initially repositioned from the starting position. For example, the handle section may remain in the actuating position. The handle section may automatically reposition back only into a partially reset position, which is, in particular, visually different from the starting position. In particular, no deformation back to the starting position can occur as a result of intended use. The deformation may be configured such that it cannot be undone by the user without being visually recognizable. This may provide an originality feature by which a user can recognize whether a can or can lid has already been opened. This is particularly advantageous for reasons of hygiene.

Preferably, an outer edge of the actuating element is rounded, preferably folded. This allows sharp edges to be avoided, which may otherwise be unpleasant for the user during operation. Preferably, an outer edge of the fastening section and/or the handle section is rounded, in particular folded. In particular, the outer edge may be bent inwards, preferably towards the lower side of the actuating element.

Preferably, the actuating element has a locking section by means of which the actuating element is locked on the lid panel in the closed position prior to an initial repositioning from the closed position to the open position. This prevents an unintentional opening. The locking section may also function as a transport lock. In particular, the locking device may be formed by a form closure and/or a snap connection of the locking section with the lid panel. The locking section is preferably disposed between an end of the handle section spaced from the pouring opening and the fastening section.

Preferably, the locking section has a locking element protruding downward from the lower side of the actuating element. In this way, the locking may be protected against manipulation. The locking section is preferably formed integrally with the actuating element, and thus the locking section is also formed integrally with the actuating element. The locking section is preferably configured such that with pushing open the actuating element without lifting the handle section, the handle section is pushed upwards, in particular out of its starting position, preferably with an irreversible deformation. This provides additional protection against an undetectable initial opening.

Preferably, the locking element is configured as a hook. The hook is preferably L-shaped. The hook may be formed in one piece with the remaining locking section.

Preferably, prior to an initial repositioning from the closed position to the open position, the locking element is disposed in the guide slot, preferably at an end region of the guide slot which faces away from the pouring opening, and there engages with the lid panel. The width of the hook is preferably smaller than the width of the guide slot at the point of engagement. A thickness of the hook, for example measured in the direction of the longitudinal axis of the guide slot, is preferably less than the width of the hook. A hook is a very simple locking element which can also be manufactured particularly easily, in particular, if the actuating element is formed from a metal sheet.

Preferably, the locking element is disposed in a recess of the closure element prior to an initial repositioning from the closed position to the open position. As a result, the can lid may have a particularly low overall height even with the locking element. The recess may be produced, for example, by deep drawing or embossing. The recess may also be a groove, in particular a rotationally symmetrical groove. The recess may also be part of the air channel already described, so that an additional recess may be dispensed with.

Preferably, the locking section prevents, via a form-fit, a movement of the actuating element from the closed position to the open position. In particular, a repositioning of the handle section from the stowed position may bring about a release of the locking, in particular a permanent release, preferably by deforming the locking element of the locking section. For example, the deformation may be plastic, and thus preferably permanent. The locking section is preferably configured to be moved together with the handle section. For this purpose, the locking section may be formed on the handle section and/or the locking section and the handle section may be attached to each other and/or the locking section may be connected to the fastening section only via the handle section. The handle section and the locking section may at least partially be a common section of the actuating element.

The locking section is preferably connected to the fastening section by a hinge, in particular via a film hinge. This hinge, in particular this film hinge, is preferably the same film hinge by which the handle section is also connected to the actuating element.

Preferably, the locking section is disposed on a lower side of the handle section. This allows a total area occupied by the actuating element on the upper side of the lid panel to be particularly small. Preferably, the locking section does not extend beyond the edge of the handle section.

Preferably, the locking section and the handle section are formed by two different layers of material. For example, the locking section may be a section of a sheet that has been folded onto the handle section, particularly on its lower side.

The two layers of material are preferably formed integrally, with a portion of an edge of the handle section forming a transition between the locking section and the handle section. Preferably, this transition has a smaller overall thickness compared to the rest of the handle section in order to facilitate reaching under for pivoting the handle section from the stowed position.

Preferably, the locking section is fixed to the handle section by a folded edge of the handle section. In this way, a sharp-edged outer edge may be prevented while at the same time the locking section is clamped to the handle section. For example, an edge of the handle section may be folded over inwardly, preferably toward the lower side of the handle section.

The locking section may be configured to lock again on the lid panel after the closure device has been reclosed. This may further prevent unintentional opening. For example, the locking element may re-engage on the lid panel when the actuating element is again repositioned into the closed position and/or the handle section is repositioned into the stowed position.

Preferably, the actuating element is formed in one piece. In particular, the locking section with the locking element, the handle section and the fastening section may be formed in one piece from a metal sheet or manufactured in one piece by injection molding.

Preferably, the closure element has at least one support section. The support section may abut the lower side of the lid panel in at least an area corresponding to the position of the hinge between the handle section and the actuating section. Thus, there may be an overlap of the support section with the hinge in the vertical direction. The support region may be, for example, a region which is free of embossing and/or recessing, in particular for the air channel. The support region may abut the lid panel. The support region may prevent unwanted deformation of the lid panel and/or overloading thereof when the handle section is folded up. In addition, the folding up may be facilitated. The support region is preferably provided at least in an end region of the hinge in the direction of the hinge axis, since there the lid panel is particularly loaded. There, the support region may support the hinge and also the lid panel. Preferably, two support sections are provided, one for each end region. Preferably, the air channel extends between these support sections. Alternatively, the air channel may also extend outside the support sections, for example.

A second aspect relates to a can. Preferably, the can is configured as a beverage can and/or a storage container for bulk materials. The can may include at least one can lid according to the first aspect. The lid panel and also the can lid may delimit an upper side of the can and there close off the interior thereof, in particular by crimping an outer circumferential edge of the lid panel to a lateral wall of the can. The can may have a can body which is, for example, manufactured in one piece in a deep-drawing process and is joined to the can lid after the can has been filled. The can body may be open at the top and/or have a through opening. This may be closed by the lid element. The can is preferably cylindrical and/or has a base which is curved in the direction of the interior.

A third aspect relates to a method of manufacturing a can lid for a can. Preferably, the can is configured as a beverage can and/or a storage container for bulk material. Preferably, the method is configured to manufacture a can lid according to the first aspect. The method may comprise one or more of the following steps:

providing a lid panel configured to delimit an upper side of the can, in particular by crimping an outer circumferential edge of the lid panel to a lateral wall of the can, the lid panel having at least one pouring opening through which a substance present in the can be poured out and a guide slot; and/or providing an actuating element and a closure element made of a metallic material, preferably of an aluminum material or tinplate; and/or disposing the closure element on an lower side of the lid panel the lower side facing an interior of the can when the can lid is attached thereto; and/or disposing the actuating element on an upper side of the lid panel, the upper side facing away from an interior of the can when the can lid is attached thereto; and/or fastening the closure element and the actuating element together by means of a connection, the connection being movable along the guide slot.

The closure element may be shifted between a closed position, in which the closure element closes the pouring opening in a fluid-tight and/or gas-tight manner, and an open position, in which the closure element at least partially exposes the pouring opening, along the lid panel substantially translationally in a guided manner by means of the actuating element.

The actuating element preferably has a locking section by means of which the actuating element is locked in the closed position on the lid panel prior to an initial repositioning from a closed position to the open position.

The connection between the closure element and the actuating element may preferably be configured as a welded connection or riveted connection. Accordingly, the closure element and the actuating element may be fastened together by means of riveting or welding. Preferably, the connection does not penetrate the closure element.

Providing the lid panel preferably comprises the following step:

providing, in particular punching or cutting out, the pouring opening and/or the guide slot, in particular as a common through opening;

and optionally one or more of the following steps:

providing embossments which, in the open position, cause an air channel of the closure element to be uncovered; and/or providing, in particular by punching or cutting out, an additional pressure equalizing opening which is spaced from the pouring opening and is uncovered first when repositioning from the closed position to the open position; and/or providing, in particular by punching or cutting out, a notch or embossment in a portion which is disposed adjacent to a portion of the pouring opening that is uncovered first when the closure element is repositioned from the closed position to the open position, and/or which delimits this portion; and providing, in particular by punching or cutting out, a relief notch at an end of the guide slot which faces away from the pouring opening.

Providing the actuating element comprises one or more of the following steps:

forming the actuating element from a single sheet metal element; and/or providing a hinge between a fastening section and a handle section (in particular a film hinge); and/or providing, in particular by embossing or deep-drawing, a protrusion into the actuating element, the protrusion having a rivet opening; and/or bending the locking section from the sheet metal element so that it is disposed on a layer side and/or parallel to another section of the actuating element, in particular on the lower side parallel to a handle section, an edge region of the handle section preferably being folded over the locking section.

Preferably, the method further comprises the following steps:

forming a region protruding on the lower side in the locking section, in particular by punching and bending;

disposing the actuating element on the upper side of the lid panel such that the protruding region protrudes through the guide slot, wherein the actuating element is preferably disposed in the closed position; and subsequently bending a portion of the protruding region, in particular by means of a slider.

These three sub-steps are preferably performed in the sequence mentioned. Preferably, the bending is performed in a direction which faces away from the pouring opening. For example, with bending a hook may be formed as a locking element. Preferably, bending is performed in such a way that a bent-over section overlaps with the lid panel, as seen in the vertical direction of the can.

Furthermore, the method may comprise providing a groove in the closure element. A seal may be inserted, pressed, glued or injected into the groove. The groove may be fixed by clamping with an outer edge of the closure element, in particular by bending over the outer edge. The bending may also be performed by folding.

A fourth aspect relates to a method of manufacturing a can, in particular a can according to the second aspect. Preferably, the method comprises the steps of manufacturing a can lid according to the method of the third aspect. The method according to the fourth aspect comprises at least the following steps:

providing a can lid according to the first aspect, wherein the can lid may have been produced by the method according to the third aspect;

connecting the can lid to a can body, in particular by crimping an outer circumferential edge of the lid panel to a lateral wall of the can body.

Further features and characteristics of the invention are embodied by the following list of items:

1. Can lid for a can, preferably configured as a beverage can and/or storage container for bulk material, comprising:

at least one lid panel configured to delimit an upper side of the can, preferably by crimping an outer circumferential edge of the lid panel to a lateral wall of the can, the lid panel having at least one pouring opening through which a substance present in the can may be poured out;

an actuating element disposed on an upper side of the lid panel which faces away from an interior of the can with the can lid attached thereto; and a closure element disposed on a lower side of the lid panel which faces an interior of the can when the can lid is attached thereto, wherein the closure element is shiftable between a closed position, in which the closure element closes the pouring opening in a fluid-tight and/or gas-tight manner, and an open position, in which the pouring opening is at least partially uncovered, along the lid panel substantially translationally in a guided manner by means of the actuating element;

wherein the closure element and the actuating element are optionally made of a metallic material, preferably an aluminum material or tinplate, and wherein the closure element and the actuating element are fastened to one another by means of a connection, preferably a riveted connection and/or a welded connection, wherein the connection preferably moves along a guide slot in the lid panel during shifting of the closure element from the closed position to the open position.

2. Can lid according to item 1,
wherein the connection configured as a riveted connection is formed by a rivet nipple formed in the closure element or the actuating element, the rivet nipple being disposed in a corresponding rivet opening of the other of the two elements.

3. Can lid according to item 2,
wherein the rivet opening extends through a protrusion, preferably through a protrusion of the actuating element which protrudes in the direction of the lower side of the lid panel.

4. Can lid according to item 3,
wherein the protrusion at least partially extends through the guide slot in the open position and/or in the closed position.

5. Can lid according to any one of the preceding items,
wherein the connection, in particular the riveted connection, is formed narrower than the guide slot at least in a region extending through the guide slot.

6. Can lid according to any one of the preceding items,
wherein at least one planar surface is formed at the connection in a region extending through the guide slot,
wherein the at least one planar surface faces an edge of the lid panel, the edge delimiting the guide slot.

7. Can lid according to any one of the preceding items,
wherein the can lid has at least one seal which is disposed between the closure element and the lid panel at least in the closed position of the closure element.

8. Can lid according to item 7,
wherein the seal is at least partially received in a groove formed on an upper side of the closure element.

9. Can lid according to item 7 or 8,
wherein the seal is fixed to the closure element by means of an outer edge of the closure element, the outer edge being bent into the seal and/or over a section of the seal.

10. Can lid according to item 8 or 9,
wherein the seal has an undercut,
and/or
a cross-section of the section of the seal received in the groove is smaller than a cross-section of the groove.

11. Can lid according to one of items 7 to 10,
wherein the seal has a round, angular or irregular cross-section.

12. Can lid according to one of items 7 to 11,
wherein the seal has two sealing lips which are spaced apart from one another and bear against the lid panel at least in the closed position.

13. Can lid according to any one of the preceding items,
wherein the lid panel and/or the closure element has a notch or embossment in a portion which is disposed adjacent to, or which delimits, a portion of the pouring opening that is uncovered first when the closure element is repositioned from the closed position to the open position.

14. Can lid according to any one of the preceding items,
wherein the lid panel further comprises a pressure equalizing opening, wherein the cross-section of the pressure equalizing opening is smaller than the cross-section of the pouring opening,
wherein the pressure equalizing opening is closed in a fluid-tight and/or gas-tight manner by the closure element in the closed position and is at least partially uncovered in the open position,
wherein the pressure equalizing opening is disposed such that, when the closure element is repositioned from the closed position to the open position, it is uncovered prior to the pouring opening.

15. Can lid according to any one of the preceding items,
wherein, in the open position, an air channel is formed between the closure element and the lid panel, the first end of the air channel opening at the upper side of the lid panel and/or at an end region of the pouring opening, the end region facing away from the outer lid panel edge, and the second end of the air channel opening at a lower side of the lid panel at an end region of the closure element, the end region facing away from the pouring opening.

16. Can lid according to item 15,
wherein the air channel is blocked in the closed position and/or in an intermediate position of the closure element between the open position and the closed position and/or sealed against the interior.

17. Can lid according to item 15 or 16,
wherein at least a portion of the air channel is formed by a recess in the closure element and/or the lid panel.

18. Can lid according to any of items 15 to 17,
wherein the first end of the air channel in the open position is formed by a gap between the closure element and the actuating element and/or between the seal and the actuating element,
wherein, in the closed position, preferably a portion of the lid panel is disposed in the gap, thereby blocking the air flow.

19. Can lid according to one of items 15 to 18,
wherein the second end of the air channel in the open position is formed by a gap between the closure element and the lid panel and/or between the seal and the lid panel.

20. Can lid according to item 19,
wherein the second end of the air channel in the open position is formed by
the lid panel having one or more embossments or bulges protruding in the direction of the upper side, the embossments or bulges forming a flow path for the air around the closure element in the open position of the closure element, thereby cancelling the sealing effect of the closure element with the lower side of the lid panel in the region of the one or more embossments; and/or the lid panel having one or more embossments protruding in the direction of the lower side and deflecting at least sections of the closure element downwards in the open position, thereby cancelling the sealing effect of the closure element with the lower side of the lid panel in the deflected region; and/or the closure element in the open position being deflected downwards at a radially outer bead of the lid panel, thereby cancelling the sealing effect of the closure element with the lower side of the lid panel in the deflected region.

21. Can lid according to any one of the preceding items, wherein the guide slot and the pouring opening form a common through opening in the lid panel.

22. Can lid according to any one of the preceding items, wherein the guide slot is elongated, with a longitudinal direction of the guide slot corresponding to a movement direction of the closure element.

23. Can lid according to any one of the preceding items, wherein the actuating element has a central region and an outer region on the lower side;
wherein the central region is set back from the outer region;
wherein the closure element supports itself on the upper side of the lid panel via the outer region, thereby pressing an upper side of the closure element and/or an upper side of the seal against the lower side of the lid panel.

24. Can lid according to any one of the preceding items, wherein the guide slot has at least one relief notch at its end which faces away from the pouring opening.

25. Can lid according to any one of the preceding items, wherein the actuating element comprises at least one fastening section in which is formed the connection with the closure element, and a handle section connected thereto, which is configured to be gripped for the purpose of repositioning between the open position and the closed position.

26. Can lid according to the preceding item, wherein the handle section is pivotable between a stowed position in which the handle section is disposed substantially parallel to the lid panel and/or the fastening section, and an actuating position in which the handle section can be gripped for repositioning between the open position and the closed position.

27. Can lid according to item 26, wherein the fastening section and the handle section are connected by means of a hinge, in particular by means of a film hinge, the hinge axis of which preferably extending transversely, preferably orthogonally to a longitudinal axis of the guide slot;
wherein the handle section is configured to be pivoted about the hinge axis relative to the fastening section for repositioning between the stowed position and the actuating position.

28. Can lid according to any of items 25 to 27, wherein the handle section has a starting position which preferably corresponds to the stowed position;
wherein the actuating element is configured such that when the handle section can no longer be permanently repositioned back to the starting position after an initial repositioning from the starting position; and/or
wherein the actuating element is configured such that it plastically deforms, in particular permanently and/or permanently visually recognizable, when the handle section is initially repositioned from the starting position.

29. Can lid according to any one of the preceding items, wherein an outer edge of the actuating element is rounded, preferably folded.

30. Can lid according to any one of the preceding items, wherein the actuating element has a locking section by means of which the actuating element is locked in the closed position on the lid panel prior to an initial repositioning from the closed position to the open position.

31. Can lid according to the preceding item, wherein the locking section comprises a locking element protruding downwardly from the lower side of the actuating element.

32. Can lid according to the preceding item, wherein the locking element is configured as a hook.

33. Can lid according to one of the two preceding items, wherein the locking element is disposed in the guide slot prior to an initial repositioning from the closed position to the open position, preferably at an end region of the guide slot which faces away from the pouring opening, and engages there with the lid panel.

34. Can lid according to any one of the three preceding items,
wherein the locking element is disposed in a recess of the closure element prior to an initial repositioning of the actuating element from the closed position to the open position.

35. Can lid according to item 30 to 34, wherein the locking section prevents, via a form-fit, a movement of the actuating element from the closed position to the open position,
wherein in particular a repositioning of the handle section from the stowed position effects a release of the locking, in particular a permanent release, preferably by deforming the locking element of the locking section.

36. Can lid according to any one of items 30 to 35, wherein the locking section is disposed on a lower side of the handle section.

37. Can lid according to one of the items 30 to 36, wherein the locking section and the handle section are formed by two different layers of material.

38. Can lid according to item 37, wherein the two layers of material are integrally formed, with a portion of an edge of the handle section forming a transition between the locking section and the handle section;
wherein preferably this transition has a reduced overall thickness relative to the remainder of the handle section to facilitate reaching under for pivoting the handle section from the stowed position.

39. Can lid according to any one of items 30 to 38, wherein the locking section is fastened to the handle section by means of a folded edge of the handle section.

40. Can lid according to any one of the preceding items, wherein the actuating element is integrally formed.

41. Can lid according to any one of items 27 to 40, wherein the closure element comprises at least one support section;
wherein the support section abuts the lower side of the lid panel in at least one region corresponding to the position of the hinge between the handle section and the actuating section.

42. Can, preferably formed as a beverage can and/or storage container for bulk material, comprising at least one can lid according to any one of the preceding items.

43. Method for manufacturing a can lid for a can, preferably configured as a beverage can and/or storage container for bulk material, preferably a can lid according to aby one of items 1 to 41, characterized by the following steps:

providing a lid panel configured to delimit an upper side of the can, in particular by crimping an outer circumferential edge of the lid panel to a lateral wall of the can, the lid panel having at least one pouring opening through which a substance present in the can may be poured out, and a guide slot;

providing an actuating element and a closure element made of a metallic material, preferably an aluminum material or tinplate;

disposing the closure element on a lower side of the lid panel, the lower side facing an interior of the can when the can lid is attached thereto;

disposing the actuating element on an upper side of the lid panel, the upper side facing away from an interior of the can when the can lid is attached thereto;

fastening the closure element and the actuating element to one another by means of a connection, in particular a riveted connection or a welded connection, the riveted connection being movable along the guide slot;

wherein the closure element is shiftable between a closed position, in which the closure element closes the pouring opening in a fluid-tight and/or gas-tight manner, and an open position, in which the closure element at least partially uncovers the pouring opening, along the lid panel substantially translationally in a guided manner by means of the actuating element, wherein the actuating element preferably has a locking section by means of which the actuating element is locked on the lid panel in the closed position prior to an initial repositioning from a closed position to the open position.

44. Method according to item 43,
wherein providing the lid panel comprises the following step:
providing, in particular punching or cutting out, the pouring opening and/or the guide slot, in particular as a common through opening;
and optionally one or more of the following steps:
providing embossments which, in the open position, cause an opening of the air channel of the closure element; and/or
providing, in particular punching or cutting out, an additional pressure equalizing opening which is spaced from the pouring opening and is uncovered first when repositioning from the closed position to the open position; and/or
providing, in particular punching or cutting out, a notch or embossment in a portion disposed adjacent to, and/or delimiting, a portion of the pouring opening, which is uncovered first when the closure element is repositioned from the closed position to the open position; and
providing, in particular punching or cutting out, a relief notch at an end of the guide slot which faces away from the pouring opening.

45. Method according to item 43 or 44,
wherein providing the actuating element comprises one or more of the following steps:
forming the actuating element from a single sheet metal element; and/or
providing a hinge between a fastening section and a handle section; and/or
introducing, in particular embossing or deep drawing, a protrusion in the actuating element, the protrusion having a rivet opening; and/or
bending the locking section out of the sheet metal element so that it is disposed on a lower side and/or parallel to another section of the actuating element, in particular on the lower side parallel to a handle section, wherein, in particular, an edge section of the handle section is folded over the locking section.

46. The method of any one of items 43 to 45, further comprising the steps of:
forming a region protruding from the lower side of the locking section, in particular by punching and bending;
disposing the actuating element on the upper side of the lid panel such that the protruding region protrudes through the guide slot, the actuating element preferably being disposed in the closed position; and
subsequently bending a portion of the protruding region, in particular by means of a slider, to preferably form a hook.

47. A method of manufacturing a can, in particular a can according to item 42, preferably also comprising the steps of manufacturing a can lid according to the method of any one of items 43 to 46, comprising at least the following steps:
providing a can lid according to any one of items 1 to 41;
connecting the can lid to a can body, in particular by crimping an outer circumferential edge of the lid panel to a lateral wall of the can body.

The present summary is provided only by way of example, and not limitation. Further advantages, features and details of the invention will be apparent from the following description of preferred embodiments and the drawings. The features and combination of features mentioned above in the description as well as the features and combination of features mentioned below in the description of the figures and/or shown solely in the figures cannot only be used in the respective mentioned combination, but also in other combinations or in isolation without leaving the scope of the invention. Respective features and feature combinations of one aspect also represent respective features and feature combinations of other aspects. The figures are not intended to limit the scope of protection of the claims.

BRIEF DESCRIPTION OF THE DRAWINGS

FIG. 12 a schematic lateral sectional view of the can lid according to FIG. 10, cut along line B-B;

FIG. 13 a schematic side sectional view of the can lid according to FIG. 10, cut along line C-C;

FIG. 14 a schematic lateral sectional view of the can lid according to FIG. 10, cut along line A-A;

FIG. 15 a schematic sectional view of a possible configuration of a seal of the can lid according to FIG. 1 and FIG. 10;

FIG. 16 schematic exploded view of a closure element;

FIG. 19 a further configuration of a closure element.

Figure 1:
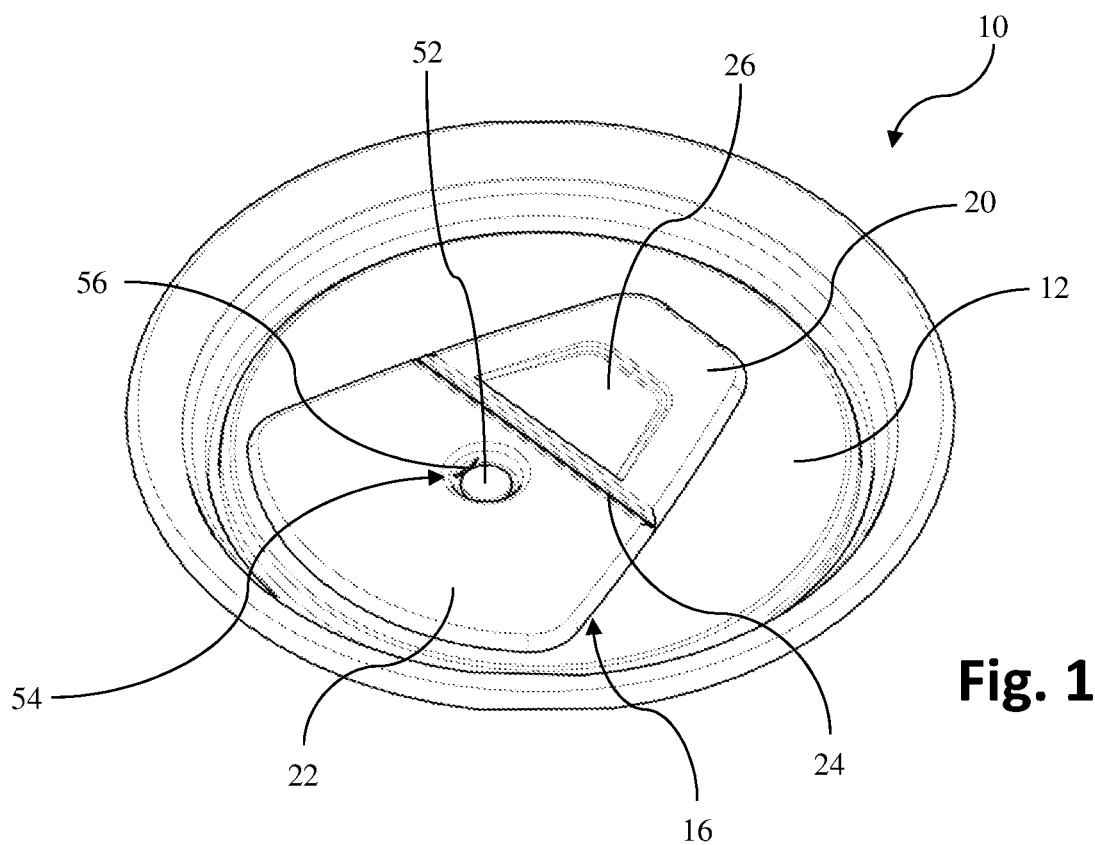
FIG. 1 a schematic top perspective view of a can lid in its closed position.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION OF ILLUSTRATIVE EMBODIMENTS

FIG. 1 shows a resealable can lid 10 for a can, for example a beverage can, from above in a schematic perspective view. The can lid has a lid panel 12 which, when attached to a can body, closes off the top of the can body. An upward direction of the can lid 10 may be defined by a standing can. The upper side of respective parts of the can lid are defined with respect to a side which faces away from an interior of the can. Respective lower sides face the interior. The terms "top" and "bottom" or "upper side" and "lower side" refer to the usual arrangement of the lid on a can. However, it goes without saying that the can lids according to the invention may also be oriented or attached to a can in a different way, if required.

Can lid 10 is a round flat body and has a circumferential bead 13 (see e.g. FIG. 2) radially on the outside for reinforcement. At its outer circumferential edge, the lid panel 12 may be crimped to the can body for connection and thus production of the sealed can. The lid panel 12 may have external dimensions and materials corresponding to a conventional lid panel for beverage cans. Here, for example, the lid panel 12 is made of a metallic material such as tinplate or aluminum sheet and has been manufactured in a deep drawing and/or punching process. On its upper side and its lower side, the lid panel 12 is additionally coated with plastic.

Figure 7:
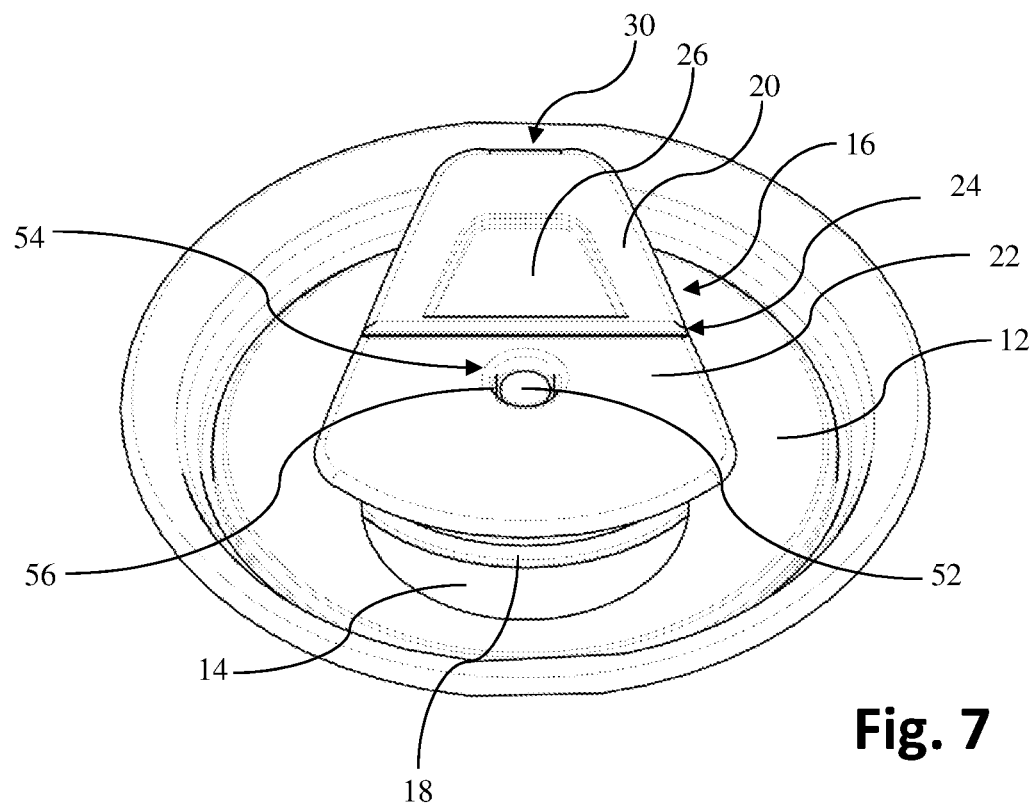
FIG. 7 a schematic top view of the can lid according to FIG. 1 in its open position.

The lid panel 12 also has a pouring opening 14, which can be seen, for example, in FIG. 7. The pouring opening 14 is at least partially oval in shape. A content of the can, such as a beverage, may be poured out through the pouring opening when the can lid 10 is open.

Furthermore, can lid 10 has an actuating element 16, which is disposed on the upper side of the lid panel 12. The can lid 10 has a closure element 18, which is disposed on the lower side of the lid panel 12. The closure element 18 is shown, for example, in FIG. 3. The closure element 18 is movable, in a translational manner and substantially free of rotation, between a closed position and an open position, these positions corresponding to a closed or open can lid 10. In its closed position, the closure element 18 closes the pouring opening 14 in a gas-tight and a liquid-tight manner. In particular, the closure element 18 covers the pouring opening 14 in the closed position thereby sealing it from the inside against the interior of the can. In its open position, the closure element 18 at least partially uncovers the pouring opening 14.

In the present invention, the actuating element 16 and the closure element 18 are made of a metallic material. For example, the actuating element 16 and the closure element 18 may be made of the same material as the lid panel 12. Preferably, the actuating element 16 and the closure element 18 also have a plastic coating on their upper and lower sides. Alternatively, the closure element 18 and/or the actuating element 16 may be formed of plastic, for example by injection molding.

The actuating element 16 is connected to the closure element 18. By a movement of the actuating element 16, the closure element 18 may therefore be moved, in particular in a guided manner, between the closed position and the open position. By way of example, one type of guiding will be described below. Preferably, the connection is formed as a riveted connection, which is shown here and will be described in further detail below. Alternatively, the connection may be a welded connection, for example.

The actuating element 16 has a handle section 20 and a fastening section 22. The actuating element 16 is integrally formed from a sheet of metal. The handle section 20 and the fastening section 22 are connected by a film hinge 24 as a joint. The film hinge 24 permits rotation of the handle section 20 relative to the fastening section 22 about the longitudinal axis thereof. Here, the film hinge 24 is formed by a local attenuation in the actuating element, for example by a notch.

Figure 2:
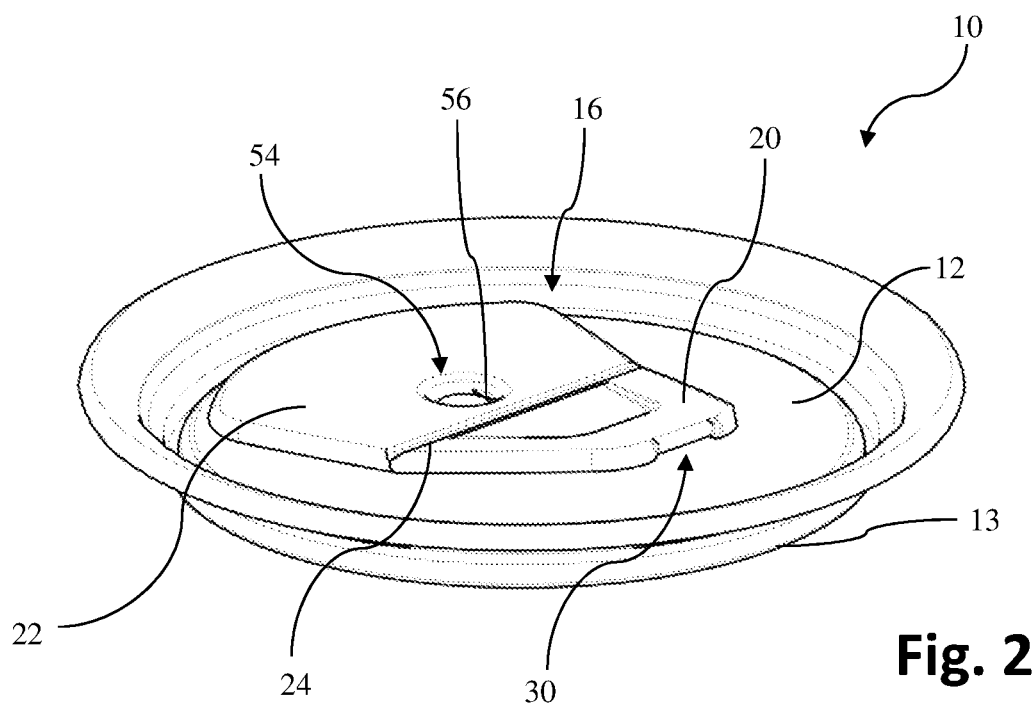
FIG. 2 a schematic top perspective view of the can lid according to FIG. 1 with a handle section of an actuating element of the can lid lifted from a starting position.

In FIG. 2, a schematic perspective view shows how the handle section 20 has been partially rotated upward from its starting position, shown in FIG. 1, relative to the fastening section 22. At its end which faces away from the fastening section 22, the handle section 20 has a region with a smaller thickness. This makes it particularly easy to lift the handle section 20 from its starting position, for example with a fingernail. In the starting position (FIG. 1), the handle section extends substantially parallel to the lid panel 12 and lies substantially flat against it.

Figure 4:
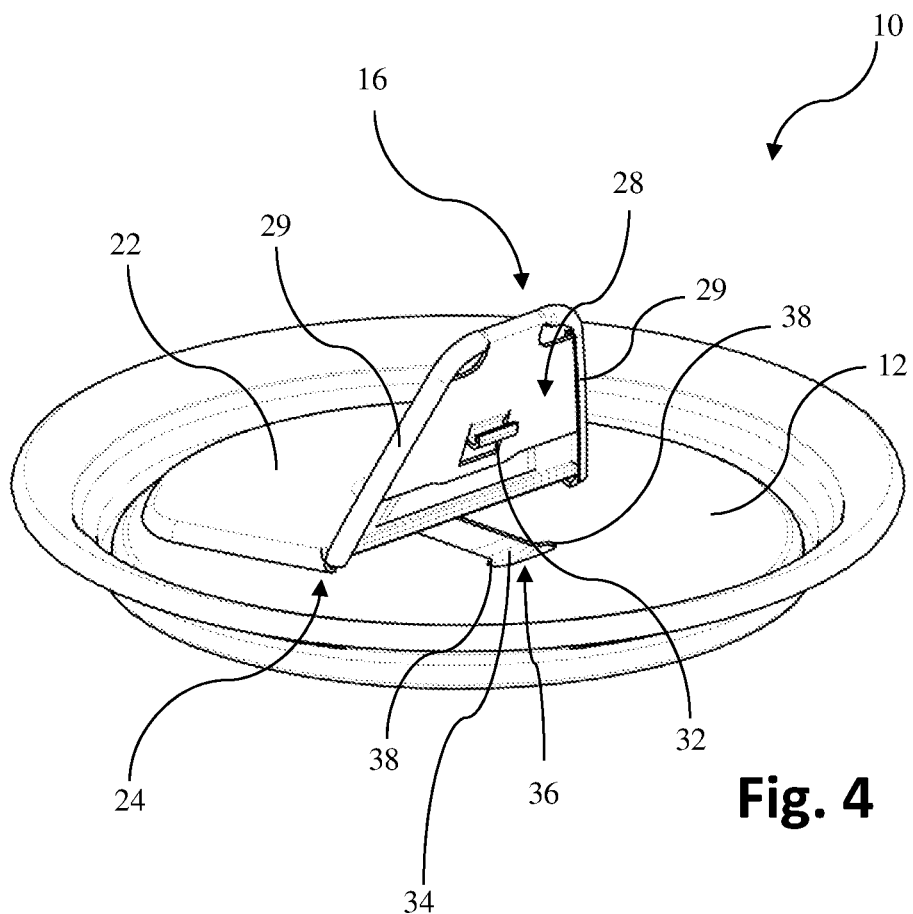
FIG. 4 a schematic top perspective view of the can lid according to FIG. 1 with the handle section in its actuating position.

FIG. 4 shows an actuating position of the handle section 20 in a schematic perspective view. In this position, the handle section 20 is rotated far upwards, for example at least 60° or at least 80° relative to a plane defined by the fastening section 22 and/or the lid panel. As a result, the handle section 20 may be gripped particularly easily for shifting the closure element 18, for example with two fingers. On its upper side, the handle section 20 additionally has a recess 26 (see FIG. 1), which may provide extra grip for a finger (in particular the thumb) during repositioning.

On the lower side, the actuating element 16 has a locking section 28. This locking section is also formed integrally with the remainder of the actuating element 16 from a metal sheet. For example, the metal sheet may be bent over (in particular folded) in the section 30 to form a second material layer on the actuating element 16. The second layer of material forming the locking section 28 may also be considered as part of the handle section 20. The two layers of material may strengthen the handle section 20, allowing higher actuating forces without causing damage. The bending over also allows the thin edge region 30 to be formed economically in a single manufacturing step. The locking section 28 is held by a rounded edge of the handle section 20 in further portions 29, which also avoids a sharp outer edge.

The locking section 28 has a locking element 32 which protrudes from the lower side. Here, the locking element 32 is configured as a hook, which can be seen particularly clearly in the side view of FIG. 3. In the starting position, the locking element 32 extends into a corresponding recess 34 of the closure element 18 so that the handle section 20 can lie flat and the hook can engage with the rear of the lid panel 12. The handle section 20 is thus locked in the starting position.

When the handle section 20 is lifted, the locking element 32 may plastically deform and thus detach itself from the lid panel 12. In this way, it is possible to provide a tamper evidence feature, which may be used to identify a first opening of the can. After initial lifting, the plastic deformation may prevent re-locking. The release of the locking element 32 may cause a noise, which may also be perceived as a signal by the user. In another embodiment, the locking element 32 may only deform substantially elastically when the can is initially opened. This allows the locking element 32 to re-lock on the lid panel when the handle section 20 is repositioned back, for example by way of a snap-in and/or a snap on connection. Thus, a transport lock may be provided even after the initial opening. This re-locking may also cause a noise, which signals the re-locking to the user.

Figure 3:
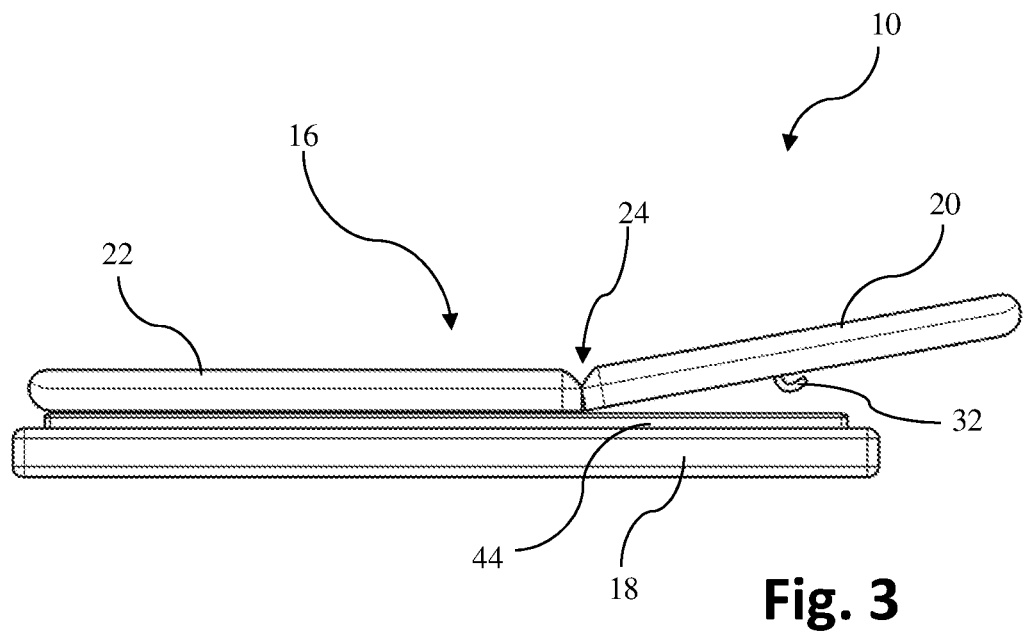
FIG. 3 a schematic side view of the can lid according to FIG. 1 without a lid panel, wherein the handle section is shown in the position according to FIG. 2.

In the embodiment shown, the actuating element 16 is preferably configured to deform after the handle section 20 is initially moved from its starting position. This may prevent the handle section 20 from being repositioned back to its starting position and/or may indicate that the handle section 20 has been initially opened. For example, the film hinge 24 may deform and/or tear at an outer edge such that the handle section 20 no longer remains in the starting position and/or that the deformation and/or tear is apparent to a user. For example, the handle section may only return to an intermediate position, as shown in FIGS. 2 and 3, after an initial opening. Advantageously, reverse bending of the handle section 20 is further prevented by the fact that downward rotation beyond the lid panel 12 would be necessary for reversing the plastic deformation but is blocked by the lid panel 12 due to the attachment of the actuating element 16 thereto. Preferably, the locking section 28 does not extend to the film hinge 24. This may facilitate a corresponding deformation as a tamper evidence feature. The starting position may correspond to a stowed position of the handle section 20 prior to an initial opening.

Figure 5:
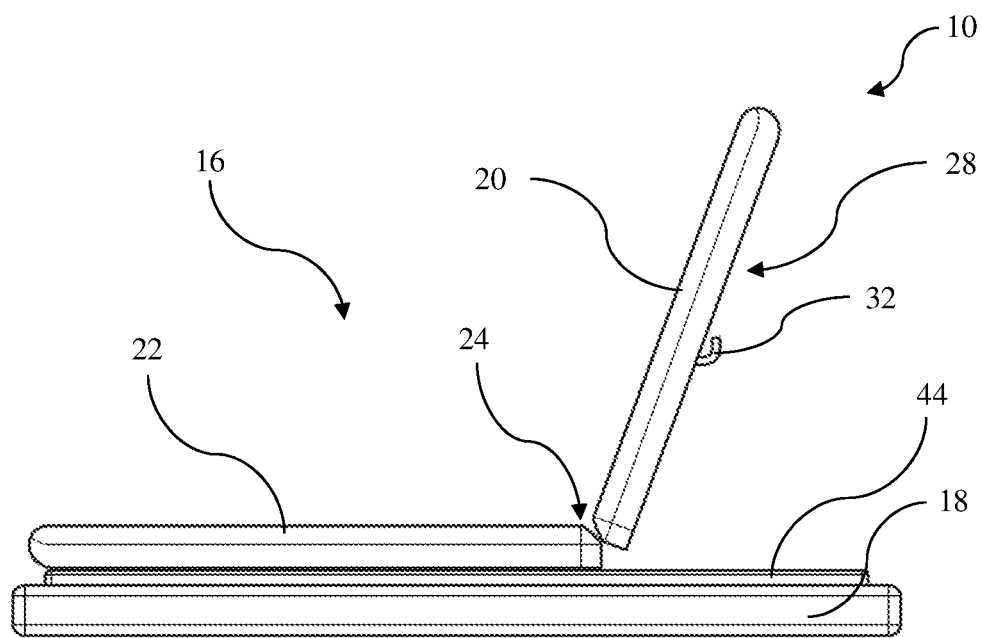
FIG. 5 a schematic side view of the can lid according to FIG. 1 without lid panel, wherein the handle section is shown in the position according to FIG. 4.
Figure 6:
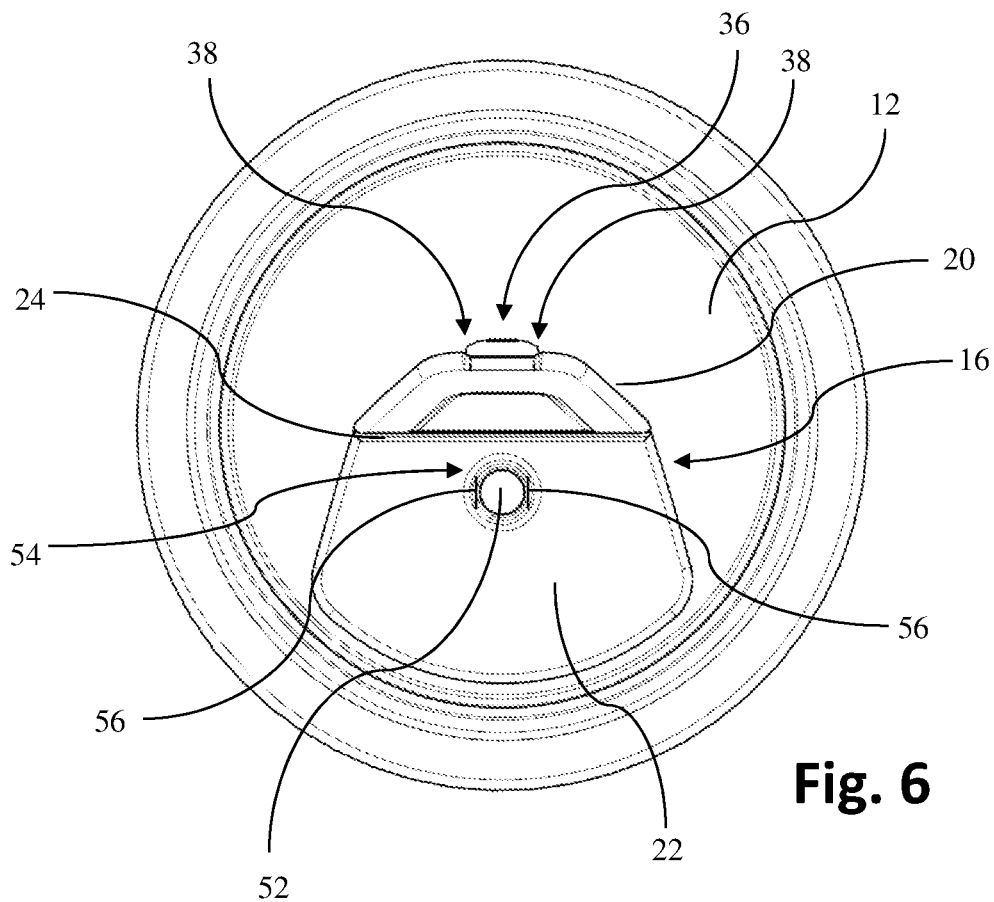
FIG. 6 a schematic top view of the can lid according to FIG. 1, wherein the handle section is shown in the position according to FIG. 4.

FIG. 5 again shows a schematic side view of the handle section 20 in its operation position. As in FIG. 3 the lid panel 12 is not shown. FIG. 6 shows a schematic top view of the can lid 10, wherein the handle section 20 is shown in the actuating position but the can lid 10 and thus also the actuating element 16 and the closure element 18 (not visible in FIG. 6) are still in the closed position. In FIG. 7, on the other hand, the can lid 10 and thus also the actuating element 16 and the closure element 18 are in the open position. For this purpose, the actuating element 16 and thus also the closure element 18 are pulled and/or pushed upwards in the image plane of FIGS. 6 and 7. Conversely, for re-sealing, the actuating element 16 and thus also the closure element 18 may be pulled and/or pushed downwards in the image plane of FIGS. 6 and 7.

Figure 8A:
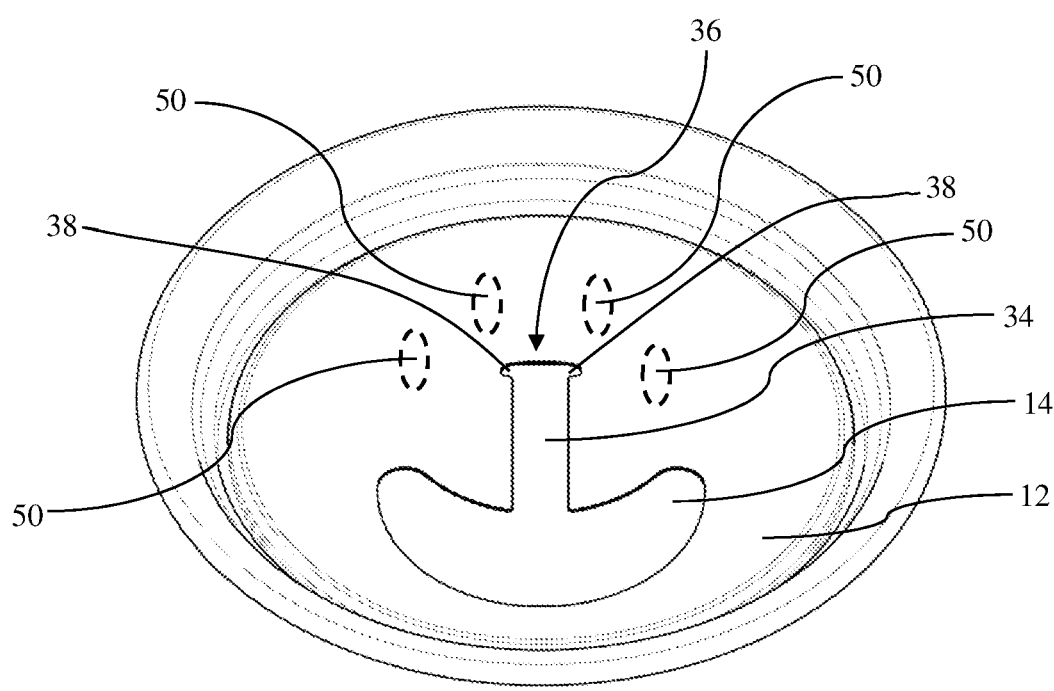
FIG. 8A a schematic top view of a lid panel for the can lid according to FIG. 1.

FIG. 8A shows the lid panel 12 in a schematic top view, with the actuating element 16 and the closure element 18 not being shown. The lid panel 12 has a further passage region in addition to the pouring opening 14 in the form of an elongated guide slot 34. The connection between the actuating element 16 and the closure element 18 is disposed in the guide slot 34, thereby guiding the shifting of the closure element 18 between the closed position and the open position. Furthermore, the locking element 32 is also disposed in the guide slot 34 before the can is initially opened.

In the embodiment shown, the pouring opening 14 and the guide slot 34 are formed as a common through opening in the lid panel 12. This allows them to be manufactured together at low cost, for example in a punching process. At its end region 36 which faces away from the pouring opening 14, can lid 12 has two relief notches 38 which extend substantially transversely to the longitudinal extension of the guide slot 34. As a result, the corners in the end region 36 of the guide slot 34 are rounded, which counteracts tearing due to internal pressure in the can.

Figure 8B:
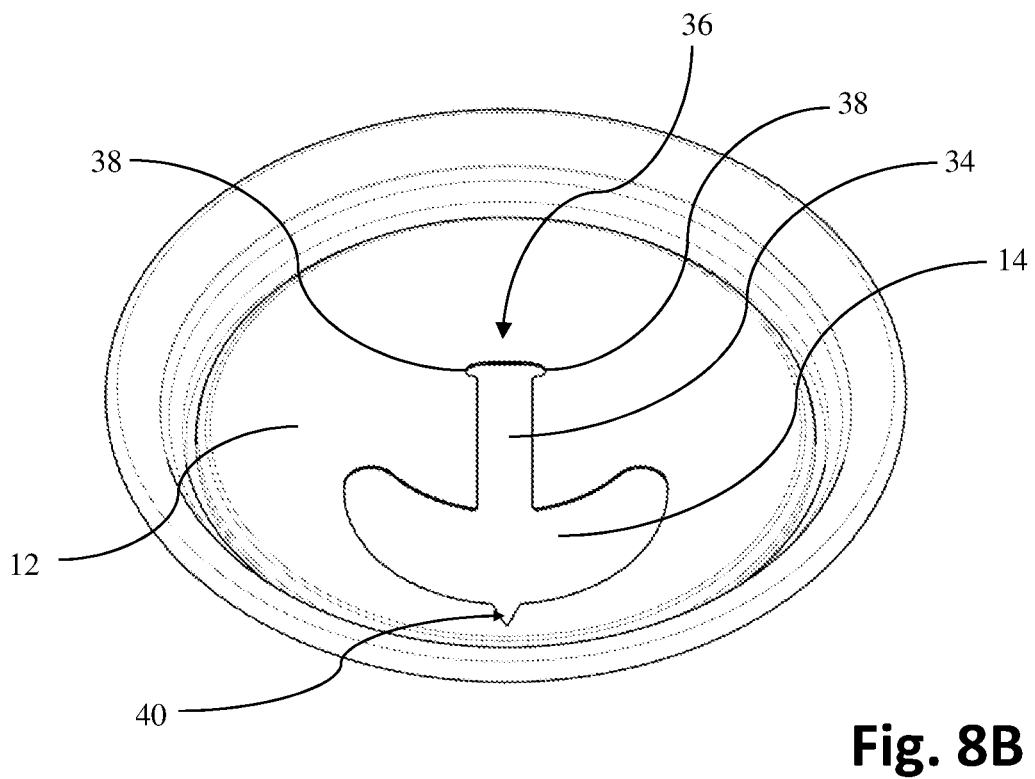
FIG. 8B a schematic top view of a variant of the lid panel of FIG. 8A.

The lid panel 12 may further have a configuration which may provide pressure equalization when the can is opened. For example, as shown in FIG. 8B, a notch 40 may optionally be disposed adjacent to the pouring opening 14 at a region remote from the direction of movement of the actuating element 16 from the closed position to the open position. This notch may form a thin channel between the interior and the exterior of the can prior to the actual uncovering of the pouring opening 14. Due to an overpressure in the interior of the can, a distinct fizzing sound may thus be produced which signals this overpressure and thus the freshness of the beverage to the user.

Figure 8C:
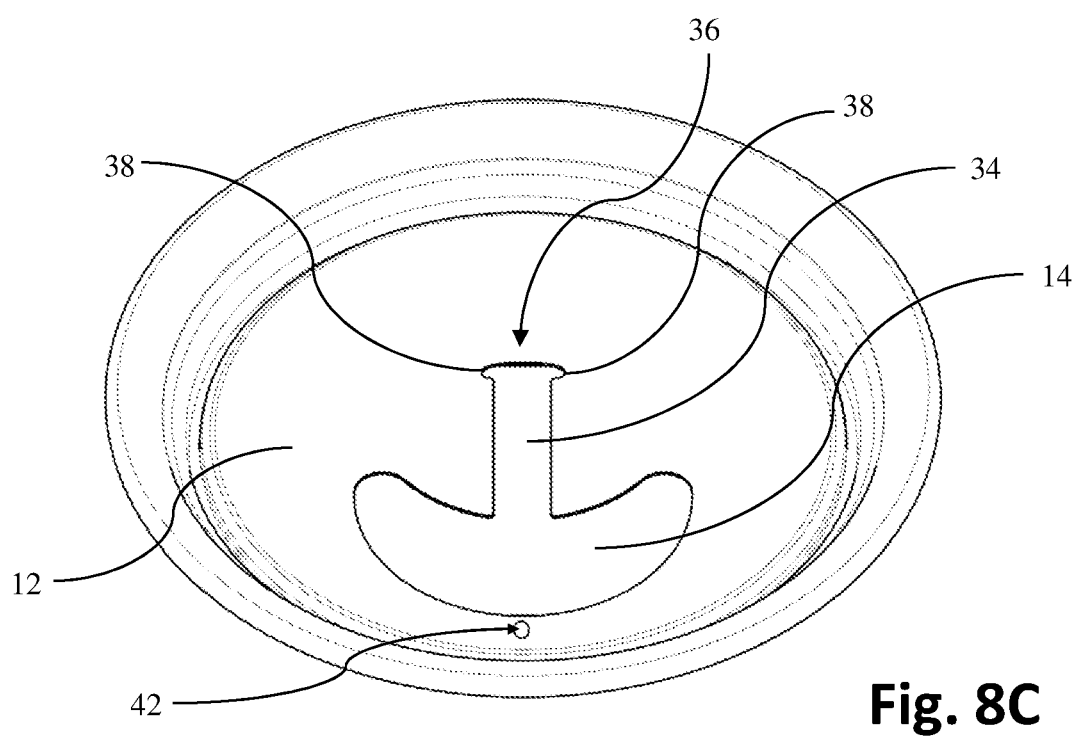
FIG. 8C a schematic top view of another variant of the lid panel of FIG. 8A.

As an alternative to a notch, as shown in FIG. 8C, an additional through opening 42 with a small diameter may optionally be disposed in this region to also uncover a channel having a small cross-section prior to the actual uncovering of the pouring opening 14 during opening. The through opening 42 may also be referred to as pressure equalizing opening. By this, too, the overpressure and thus the freshness of the can contents may be acoustically signaled to a user.

Figure 9A:
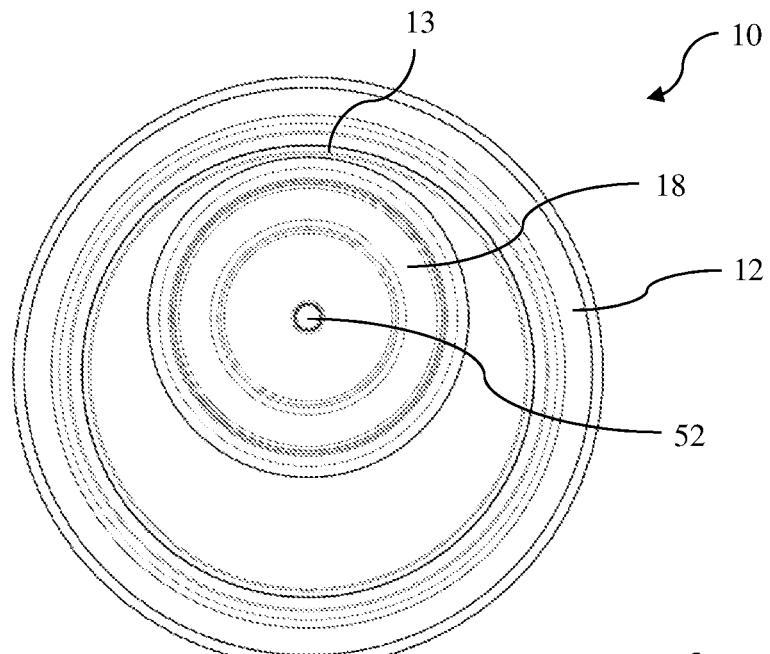
FIG. 9 a schematic bottom view of a can lid according to FIG. 1 in its closed position.
Figure 9B:
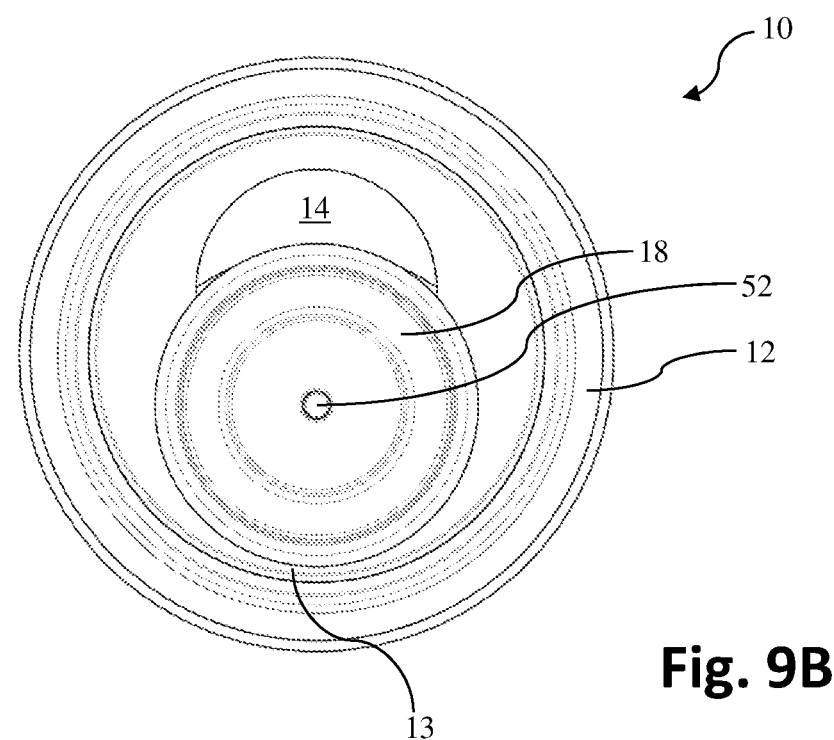

In FIG. 9A the can lid 10 with the closure element 18 in the closed position is shown in a bottom view. The closure element 18 covers the pouring opening 14. In FIG. 9B, the closure element 18 is shown in the open position. The pouring opening 14 is largely uncovered. In particular, the pouring opening 14 is uncovered such that a drinking straw (not shown) may be passed directly through the pouring opening 14 into the can.

Figure 10:
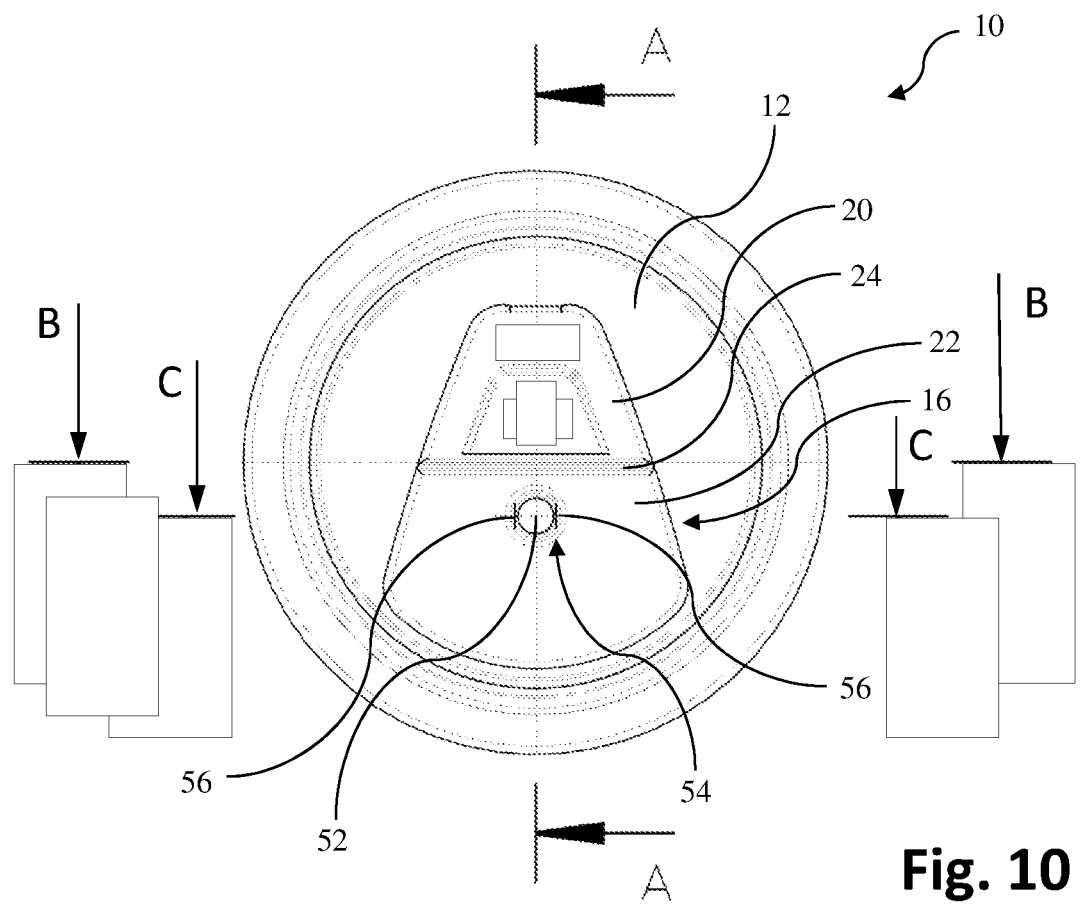
FIG. 10 a schematic top view of a further embodiment of the can lid in its closed position.

FIG. 10 illustrates the can lid 10 in a further top view.

Figure 11:
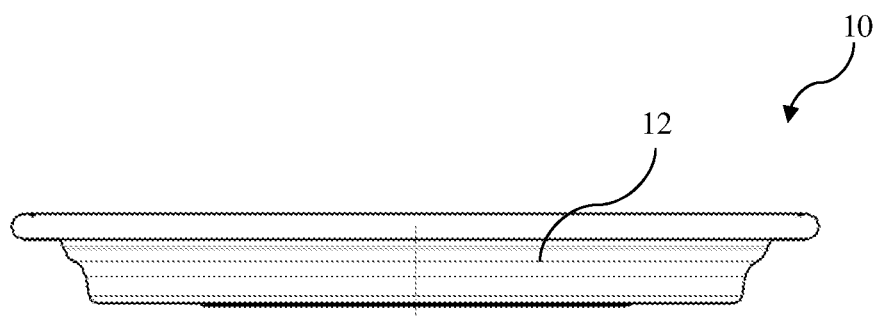
FIG. 11 a schematic side view of the can lid according to FIG. 10.

FIG. 11 shows the can lid 10 according to FIG. 10 in a schematic side view. FIG. 12 corresponds to a sectional view along the line B-B as indicated in FIG. 10.

It can be seen in FIG. 12 that a seal 44 is disposed on the closure element 18 in a groove on the upper side and faces the lid panel 12. The seal 44 can also be seen in FIGS. 3 and 5. The closure element 18 is connected to the actuating element 16 such that the seal 44 is pressed against the lower side of the lid panel 12, thus sealing the pouring opening 14 in the closed position. For this purpose, the actuating element 16 rests only with its curved edge 46 on the upper side of the lid panel 12 and may thus be easily preloaded. For example, the actuating element may be substantially straight in the unconnected state and may be bent through towards the closure element 18 when connected thereto. Alternatively, the closure element, in particular the lower side thereof, may be cambered, in particular concavely cambered, in the unconnected state.

In the area of the film hinge 24, the closure element 18 has a region 49 abutting the lid panel 12. This may support the actuating element 18, in particular the film hinge 24, as well as the lid panel 12 in this region when the handle section 20 is pivoted. In this way, overloading and unwanted deformation of the lid panel 12 may be prevented. Alternatively, or additionally, the closure element 18 may abut the lid panel along a central region 47.

In another aspect, the closure element 18 includes respective recesses 48. These recesses 48 may provide an additional air channel between the can interior and an ambiance when in the open position. Air may flow back through the air channel during pouring to allow for rapid and uniform pouring. For example, an inlet of the air channel may be formed by an opening between the actuating element 16 and the closure element 18. In the closed position, this opening is blocked by the lid panel 12. Moving this inlet into the region of the pouring opening 14 opens a gap between the actuating element 16 and the closure element 18 through which air can flow.

An opening may be uncovered as an outlet of the air channel by deflecting the closure element 18 at the circumferential bead 13 of the lid panel 12, thereby spacing it from the lower side of the lid panel. The closure element 18 and/or the lid panel 12 may elastically deform to also open a gap. The closure element may rotate slightly downward in an end region, so to speak. Alternatively, in the lid panel 12, a recess 50 in the form of an embossment may be disposed in the direction of the can interior downwards in this region (not shown), which may also bring about such a section-wise deflection of the closure element 18 from the lid panel 12.

Alternatively, one or more bulges 50 may be formed in the lid panel 12 in the upward direction. This also makes it possible to open at least one passage for the air channel in the open position. In this variant, the lid panel 12 is particularly resistant to deformation by internal can pressure. FIG. 8A illustrates, by way of example, four bulges 50 by dashed lines. These bulges may be produced as embossments.

FIG. 13 shows the sectional view of the can lid 10 along line C-C, FIG. 14 that along line A-A. Here, the connection of the actuating element 16 to the closure element 18 is seen particularly well. The connection does not penetrate the closure element 18. Instead, the closure element 18 has a rivet nipple 52 which protrudes from the closure element 18 toward the upper side and is at least partially disposed in the guide slot 34. The rivet nipple 52 extends through a rivet opening in the actuating element 16 to the upper side thereof and is clamped thereto by riveting. The actuating element 16 engages at least partially behind the rivet nipple 52.

The rivet opening of the actuating element 16 is disposed in a recess 54 of the actuating element 16 formed in the direction of the lower side. The recess 54 may also be considered as a protrusion, which preferably protrudes towards the lower side of the lid panel 12. The recess 54 extends into the guide slot 34 and may bear against the edge of the guide slot 34 formed by the lid panel 12 for guiding the repositioning movement between the closed position and the open position. The recess 54 allows the riveted connection, and thus also can lid 10, to have a low overall height. In particular, the riveted connection thus only needs to have a slightly greater height than a conventional riveting of a lid panel to a metal tab of a conventional can that is not resealable. As a result, conventional machines and processes may also be used for the can lid 10. In particular, the riveted connection does not need to have a thickness of the material of the lid panel 12, the actuating element 16 and the closure element 18, but only a thickness of the actuating element 16 and the closure element 18.

The recess 54 may also provide an anti-twist protection. For this purpose, the recess 54 has two substantially planar surfaces 56, which can be seen, inter alia, in FIG. 10. For example, the planar surfaces 56 extend substantially parallel to the edge of the lid panel 12 which delimits the guide slot 34. The planar surfaces 56 may bear against this edge as the actuating element 16 is shifted along the guide slot 34, thereby preventing unwanted rotation of the actuating element 16.

In the sectional view along line A-A according to FIG. 14, the double layer of material of the actuating element 16 in the region of the handle section 20 is seen particularly well. In addition, it can easily be seen that the locking element 32 engages behind the lid panel 12. FIG. 14 also shows that in this embodiment the handle section 20 is slightly inclined relative to the fastening section 22 toward the lid panel 12 before it is opened for the first time, and that it fits tightly thereto due to the locking.

FIG. 15 shows a particularly advantageous cross-sectional configuration of the seal 44 in a sectional view. It is shown that the seal 44 is at least partially received in a groove 58 of the closure element 18. The seal 44 has a sealing lip 60 on the upper side, with which it contacts the lower side of the lid panel 12. The sealing lip 60 is preferably inclined. In particular, the sealing lip 60 may extend radially inwardly from the groove 58 and/or be inclined radially inwardly. Below and radially inwardly of the sealing lip 60, the latter has an undercut 62. When the sealing lip 60 is pressed more strongly, for example due to an increased internal can pressure, the sealing lip may divert into this clearance. Thus, varying pressures may be compensated for without damaging the seal 44. In addition, due to friction between the seal 44 and the lid panel 12, an actuating force may vary less strongly with the internal can pressure. Radially outwardly, a clearance 64 is preferably provided in the groove 58, which is not occupied by the seal 44. This allows an compensation movement of the sealing lip 60 upon a movement to the left in the image plane of FIG. 15, by which the sealing lip 60 may be protected from damage during repeated opening and closing of the can lid 10.

FIGS. 12 to 14 show, as a further option, that the seal 44 may be clamped in the groove 58 by means of a folded edge 45 and/or that the groove may be formed by such a fold. In this way, an outer edge of the closure element 18 is sealed by the seal 44. This edge may, for example, not be coated with plastic. In this way, it is possible to prevent entry of metal particles into the can contents and/or corrosion of said edge, in particular by preventing contact with the can contents. Furthermore, the seal 44 is securely and simply held.

FIG. 16 again illustrates the shape of the closure element 18 in an exploded view before it is connected to the seal 44. It shows the rivet nipple 52 which is surrounded by the central region 47. At least sections of the central region, or, as shown in FIG. 16, the complete circumference thereof is surrounded by the recess 48 which also forms the air channel. A raised section 49 surrounding at least sections of the recess 48, or, as shown in FIG. 16, the complete circumference thereof, is provided, wherein the raised section 49 may bear against the lid panel 12 to support the hinge 24. The closure element 18 is preferably rotationally symmetrical for ease of fabrication.

Figure 17:
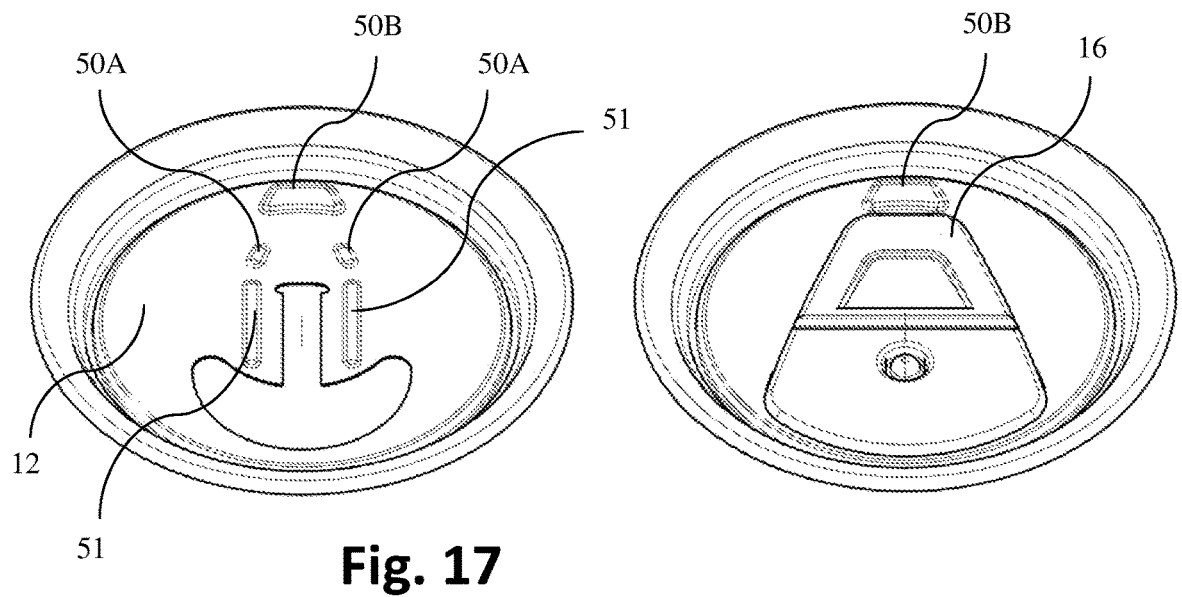
FIG. 17 another configuration of a lid for use with the closure system.
Figure 18:
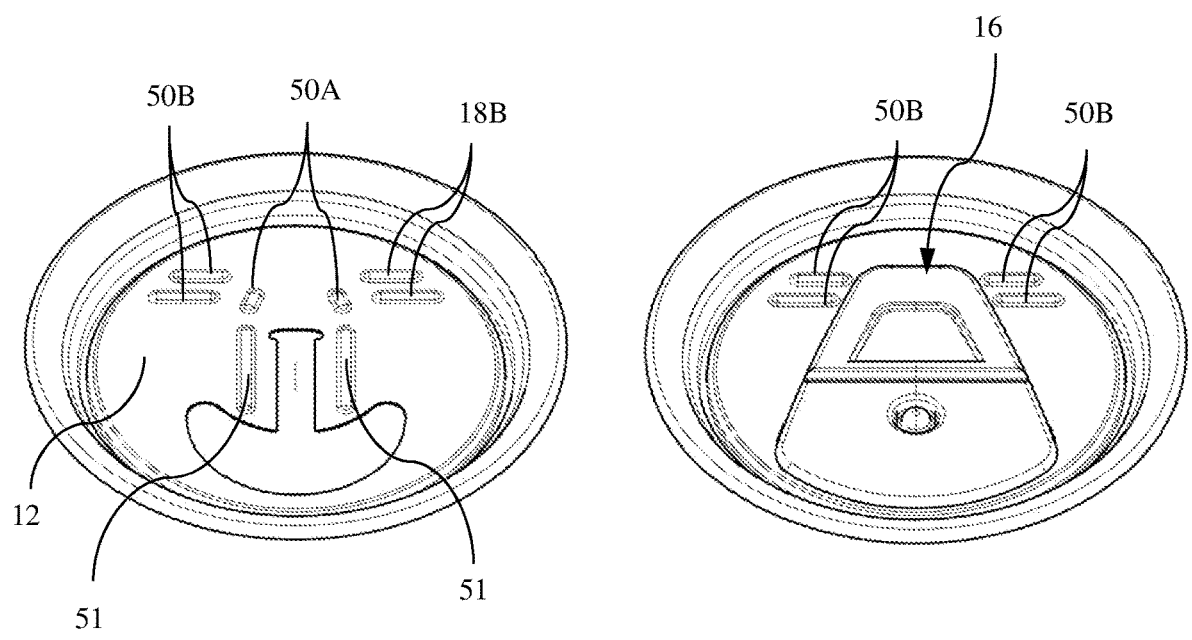
FIG. 18 a further configuration of a lid for use with the closure system.

FIGS. 17 and 18 show further optional features and embodiments of the lid panel 12 that may be used in combination with any of the lid panels 12 described above. Here, the lid panel 12 has at least one first recess 50A or a plurality of recesses 50A that may form a second open end of the air channel 48 during opening of the closure element 20 and/or in the open position thereof, as described above.

The at least one first recess 50A is preferably disposed such that it is disposed within the seal 49 in the closed position of the closure element 18 (see FIGS. 16 and 19).

The at least one first recess 50A is preferably disposed such that is to be covered, preferably completely covered, in the closed position of the closure element 18 (not shown in FIGS. 17 and 18) and/or the actuating element 16.

When the closure element 20 is repositioned from the closed position to the open position, a position, in particular an intermediate position, is preferably reached in which the seal 50 and/or the closure element 20 partially overlap(s) the at least one first recess 50A. In this way, pressure equalization may be achieved, in particular an initial pressure equalization, when the closure element 18 is opened. The at least one first recess 50A may be disposed such that, in the open position, it is completely overlapped by the closure element 18 and/or is disposed completely within the seal 44.

In combination with, or independently of, the at least one first recess 50A, the lid panel 12 may comprise at least one second recess 50B. This is preferably disposed such that it is not covered by the closure element 18 in the closed position and/or is not disposed, not even partially, within the seal 44 in the closed position. Preferably, the at least one second recess 50B is not concealed by the actuating element 16 in the closed position. In the open position, the at least one second recess is preferably partially (in particular only partially) overlapped by the closure element 20 and/or the seal 50 and/or the actuating element 16. In the closed position, the second recess 50B may thus provide an alternative open second end for the air channel 48. The use of different recesses 50A, 50B allows the flow of air through the air channel 48 to be selectively adjusted. For example, the at least one first recess may be sized such that fizzing occurs upon opening. For example, the at least one second recess 50B may be sized to prevent gurgling noises during pouring, particularly when the closure element 18 is fully open.

The second recess 50B may be formed, for example, as one or more recesses 50B disposed behind the actuating element 30 (see FIG. 17) and/or next to the actuating element 16 in the direction of shifting of the actuating element 16 (see FIG. 18).

The at least one first recess 50A and/or the at least one second recess 50B may protrude upward or downward. The at least one first recess 50A and/or the at least one second recess 50B may in particular be formed as an embossment in the lid panel 12.

In combination with, or independently of, the at least one first recess 50A and/or the at least one second recess 50B, the lid panel 12 may further comprise one or more (in particular two) third recesses 51. These may cooperate with one or more corresponding protrusions 73 on the upper side of the closure element 18 (see FIG. 21) to provide a longitudinal guide and/or an anti-twist protection for the closure element 18. In this respect, the recess 51 preferably protrudes upwardly. It may be formed as an embossment in the lid panel 12.

FIG. 19 shows a further embodiment of the closure element 18 to illustrate some further optional features. In particular, the closure element here has a first abutting region 49A and a second abutting region 49B, both of which protrude upwardly from the closure element 18. They serve to support the hinge. Independently of the abutting regions 49A, 49B, the closure element may further comprise a recess for receiving the locking element, which in the embodiment shown is provided as a recess 74 in addition to the air channel 48. As can also be seen, the closure element 18 does not need to be rotationally symmetrical.

Although a can lid and a can are described above, the disclosed closure device may also be attached to other containers for liquids. Such containers for liquids may, for example, be made of cardboard, plastic and/or metal. This applies in particular to containers which, at least in the region of a pouring opening, are made of a sufficiently rigid material. In the case of a liquid container, the lid panel mentioned herein may, for example, be substituted by a container wall and/or be formed by such a wall.

Moreover, although the present invention has been described with reference to preferred embodiments, workers skilled in the art will recognize that changes may be made in form and detail without departing from the spirit and scope of the invention.

REFERENCE LIST 10 can lid
12 lid panel
13 bead
14 pouring opening
16 actuating element
18 closure element
20 handle section
22 fastening section
24 film hinge
26 recess
28 locking section
29 portion
30 thin region
32 locking element
34 guide slot
36 end region
38 relief notch
40 notch
42 through opening
44 seal
45 folded edge
46 edge
47 central region
48 recess
49 abutting region
49 first abutting region 49 second abutting region
50 recess
50 first recess
50 second recess
51 third recess
52 rivet nipple
54 recess
56 planar surface
58 groove
60 sealing lip
62 undercut
64 clearance
73 protrusion
74 cavity

The invention claimed is:

1. A can lid for a can, the can lid comprising:
at least one lid panel configured to delimit an upper side of the can, including by crimping an outer circumferential edge of the lid panel to a lateral wall of the can, the lid panel having at least one pouring opening through which a substance present in the can may be poured out;
an actuating element disposed on an upper side of the lid panel which faces away from an interior of the can when the can lid is attached thereto; and
a closure element disposed on a lower side of the lid panel which faces an interior of the can when the can lid is attached thereto, wherein the closure element is shiftable in a guided manner by the actuating element between a closed position, in which the closure element closes the pouring opening in a liquid-tight and/or gas-tight manner, and an open position, in which the pouring opening is at least partially uncovered, along the lid panel substantially translationally in a straight line parallel to a plane in which the lid panel extends;
wherein the closure element and the actuating element are made of a metallic material; and
wherein the closure element and the actuating element are fastened to one another by a connection, wherein the connection moves along a guide slot in the lid panel during shifting of the closure element from the closed position to the open position, wherein a distance between the actuating element and the closure element in an area of the connection is non-variable.

2. The can lid according to claim 1,
wherein the connection configured as a riveted connection is formed by a rivet nipple formed in the closure element or the actuating element, the rivet nipple being disposed in a corresponding rivet opening of the other of the two elements.

3. The can lid according to claim 2,
wherein the rivet opening extends through a protrusion.

4. The can lid according to claim 1,
wherein at least one planar surface is formed on the connection in a region extending through the guide slot;
wherein the at least one planar surface faces an edge of the lid panel, the edge delimiting the guide slot.

5. The can lid according to claim 1,
wherein the can lid has at least one seal which is disposed between the closure element and the lid panel at least in the closed position of the closure element.

6. The can lid according to claim 5,
wherein a cross-section of the portion of the seal received in a groove is smaller than a cross-section of the groove.

7. The can lid according to claim 1,
wherein the lid panel and/or the closure element has a notch or an embossment in a portion which is disposed adjacent to, or which delimits, a portion of the pouring opening which is uncovered first when the closure element is repositioned from the closed position to the open position.

8. The can lid according to claim 1,
wherein the lid panel further comprises a pressure equalizing opening, wherein the cross-section of the pressure equalizing opening is smaller than the cross-section of the pouring opening;
wherein the pressure equalizing opening is closed in a liquid-tight and/or gas-tight manner by the closure element in the closed position, and is at least partially uncovered in the open position; and
wherein the pressure equalizing opening is disposed such that, when the closure element is repositioned from the closed position to the open position, it is uncovered prior to the pouring opening.

9. The can lid according to claim 1,
wherein, in the open position, an air channel is formed between the closure element and the lid panel, the first end of the air channel opening at the upper side of the lid panel and/or at an end region of the pouring opening, the end region facing away from the lid panel edge, and the second end of the air channel opening at a lower side of the lid panel at an end region of the closure element, the end region facing away from the pouring opening.

10. The can lid according to claim 1,
wherein the actuating element has at least one fastening section, in which the connection with the closure element is formed, and a handle section connected thereto configured for gripping for the purpose of repositioning between the open position and the closed position; and
wherein the fastening section and the handle section are connected by a film hinge, the hinge axis thereof extending transversely to a longitudinal axis of the guide slot, wherein the handle section is configured to be pivoted about the hinge axis relative to the fastening section for repositioning between the stowed position and the actuating position.

11. The can lid according to claim 10,
wherein the handle section has a starting position;
wherein the actuating element is configured such that the handle section can no longer be permanently repositioned back into the starting position after it is initially repositioned from the starting position;
and/or
wherein the actuating element is configured such that it plastically deforms, in particular permanently and/or permanently visually recognizable, when the handle section is initially repositioned from the starting position.

12. The can lid according to claim 10,
wherein the actuating element has a locking section by which the actuating element is locked in the closed position on the lid panel prior to an initial repositioning from the closed position to the open position.

13. A can, comprising at least one can lid according to claim 1.

14. A method for manufacturing a can lid for a can, comprising the following steps:
providing a lid panel configured to delimit an upper side of the can, in particular by crimping an outer circumferential edge of the lid panel to a lateral wall of the can, the lid panel having at least one pouring opening, through which a substance present in the can can be poured out, and a guide slot;

providing an actuating element and a closure element made of a metallic material;

disposing the closure element on a lower side of the lid panel, the lower side facing an interior of the can when the can lid is attached thereto;

disposing the actuating element on an upper side of the lid panel, the upper side facing away from an interior of the can when the can lid is attached thereto;

fastening the closure element and the actuating element to one another by a connection, the connection being movable along the guide slot, a distance between the actuating element and the closure element in an area of the connection being non-variable;

wherein the closure element is shiftable in a guided manner by the actuating element between a closed position, in which the closure element closes the pouring opening in a liquid-tight and/or gas-tight manner, and an open position, in which the closure element at least partially uncovers the pouring opening, along the lid panel substantially translationally in a straight line parallel to a plane in which the lid panel extends.

15. The method according to claim 14, wherein the actuating element comprises a locking section by which the actuating element is locked in the closed position on the lid panel prior to an initial repositioning from a closed position to the open position.

16. The method of claim 15, further comprising the steps of:

forming a region protruding on the lower side in the locking section by punching and bending;

disposing the actuating element on the upper side of the lid panel such that the protruding region protrudes through the guide slot, wherein the actuating element is disposed in the closed position; and subsequently bending a portion of the protruding region, in particular by a slider.

17. The can lid according to claim 3, wherein the protrusion is a protrusion of the actuating element that protrudes in the direction of the lower side of the lid panel, and wherein the protrusion extends at least partially through the guide slot in at least one of the open position and the closed position.

18. The can lid according to claim 5, wherein the seal is at least partially received in a groove which is formed on an upper side of the closure element.

19. The can lid according to claim 5, wherein the seal is fixed to the closure element by an outer edge of the closure element, the outer edge being bent into the seal and/or over a section of the seal.

20. The can lid according to claim 10, wherein the handle section is pivotable between a stowed position, in which the handle section is disposed substantially parallel to the lid panel and/or to the fastening section, and an actuating position, in which the handle section is grippable for repositioning between the open position and the closed position.

21. The method according to claim 14, wherein the connection is selected from the group consisting of a riveted connection, a welded connection, and combinations thereof.

22. The can lid according to claim 1, wherein the connection is selected from the group consisting of a riveted connection, a welded connection, and combinations thereof.

* * * * *